US009295027B2

(12) United States Patent
Yang et al.

(10) Patent No.: US 9,295,027 B2
(45) Date of Patent: Mar. 22, 2016

(54) SIGNAL PROCESSING TO EXTRACT A PEDESTRIAN'S MOVING DIRECTION

(71) Applicant: Google Inc., Mountain View, CA (US)

(72) Inventors: Qingxuan Yang, Beijing (CN); Edward Y. Chang, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/376,717

(22) PCT Filed: Mar. 26, 2013

(86) PCT No.: PCT/CN2013/073233
§ 371 (c)(1),
(2) Date: Aug. 5, 2014

(87) PCT Pub. No.: WO2014/153727
PCT Pub. Date: Oct. 2, 2014

(65) Prior Publication Data
US 2016/0007317 A1    Jan. 7, 2016

(51) Int. Cl.
H04W 24/00 (2009.01)
H04W 64/00 (2009.01)
H04M 1/725 (2006.01)
G01P 15/14 (2013.01)
G01P 15/02 (2013.01)

(52) U.S. Cl.
CPC ............. *H04W 64/006* (2013.01); *G01P 15/02* (2013.01); *G01P 15/14* (2013.01); *H04M 1/72569* (2013.01)

(58) Field of Classification Search
CPC ....... H04W 4/027; H04W 4/02; H04W 4/026; H04W 8/22
See application file for complete search history.

(56) References Cited

U.S. PATENT DOCUMENTS

| 6,571,193 | B1* | 5/2003 | Unuma | A43B 3/0005 340/853.2 |
| 6,634,207 | B1 | 10/2003 | Lottman et al. | |
| 6,681,196 | B2* | 1/2004 | Glaser | B60R 21/013 180/282 |
| 7,171,331 | B2* | 1/2007 | Vock | A43B 3/00 455/3.01 |

(Continued)

FOREIGN PATENT DOCUMENTS

| CN | 1717573 A | 1/2006 |
| CN | 1940570 A | 4/2007 |

(Continued)

OTHER PUBLICATIONS

International Search Report and Written Opinion for Application No. PCT/CN2013/073233 dated Jan. 2, 2014.

(Continued)

*Primary Examiner* — Khalid Shaheed
(74) *Attorney, Agent, or Firm* — Lerner, David, Littenberg, Krumholz & Mentlik, LLP

(57) ABSTRACT

Disclosed here are methods and systems that relate to determining a moving direction of a mobile device user. The methods and systems relate to using an inertial navigation system such as an accelerometer and gyroscope to aid in the determination of the moving direction of the user. The methods and systems may receive an acceleration reading associated with the mobile device, and determine a step frequency of the user based on the acceleration reading. The methods and systems may determine a theoretical model to fit the acceleration reading, and may determine the moving direction of the user based on the theoretical model.

20 Claims, 17 Drawing Sheets

(56) References Cited

U.S. PATENT DOCUMENTS

| | | | |
|---|---|---|---|
| 7,174,277 B2* | 2/2007 | Vock | A43B 3/0005 340/545.6 |
| 2003/0191582 A1 | 10/2003 | Terada | |
| 2004/0064286 A1 | 4/2004 | Levi et al. | |
| 2005/0231359 A1* | 10/2005 | Kampel | A63B 29/021 340/539.13 |
| 2006/0037395 A1* | 2/2006 | Ploechinger | G01C 19/58 73/488 |
| 2007/0067105 A1 | 3/2007 | Lee et al. | |
| 2008/0214360 A1 | 9/2008 | Stirling et al. | |
| 2011/0054834 A1 | 3/2011 | Partridge et al. | |

FOREIGN PATENT DOCUMENTS

| | | | |
|---|---|---|---|
| CN | 101369194 | A | 2/2009 |
| CN | 101907467 | A | 12/2010 |
| CN | 101999131 | A | 3/2011 |
| CN | 102033220 | A | 4/2011 |
| CN | 102053775 | A | 5/2011 |
| CN | 102419180 | A | 4/2012 |
| JP | 2006175206 | A | 7/2006 |
| JP | 2007325295 | A | 12/2007 |
| JP | 2010112854 | | 5/2010 |
| KR | 100801417 | B1 | 2/2008 |
| WO | 2013028931 | A1 | 2/2013 |

OTHER PUBLICATIONS

Allan et al., "A mofified "Alan Variance" with increased oscillator characterization ability", Proc. 35th Ann. Freq. Control Symposium, USAERADCOM, Ft. Monmouth, NJ, May 1981.

Arulampalam et al., "A tutorial on particle filters for online nonlinear/non-gaussian bayesian tracking", IEEE transactions on signal processing, vol. 50, No. 2, Feb. 2002.

Biswas et al., "WiFi localization and navigation for autonomous indoor mobile robots", 2010 IEEE International Conference on Robotics and Automation, Anchorage Convention District, May 3-8, 2010, Anchorage, Alaska, USA.

Chinese Office Action for Application No. 201180073941.2 dated Oct. 15, 2014.

Constandache et al., "EnLoc: Energy-efficient localization for mobile phones", INFOCOM 2009, IEEE, pp. 2716-2720.

Constandache et al., "Towards mobile phone localization without war-driving", pp. 2321-2329, INFOCOM'10 Proceedings of the 29th conference on Information communications, 2010 Proceedings IEEE.

Cypriani et al., "Wi-Fi-Based indoor positioning: Basic techniques, hydrid algorithms and open software platform", 2010 International Conference on Indoor Positioning and Indoor Navigation (IPIN), Sep. 15-17, 2010, Zürich, Switzerland.

Extended European Search Report for Application No. EP11870204 dated Dec. 1, 2014.

Fong et al., "Methods for in-field user calibration of an inertial measurement unit without external equipment", Measurement Science and Technology 19 (2008) 085202 (11 pp).

Fong W T et al: "Methods for in-field user calibration of an inertial measurement unit without external equipment; Methods for in-field user calibration of an IMU without external equipment", Measurement Science and Technology, IOP, Bristol, GB, vol. 19, No. 8, Aug. 1, 2008, p. 85282, XP828144339.

Hattori et al., "Hybrid indoor location estimation system using image processing and WiFi strength", 2009 International Conference on Wireless Networks and Information Systems, pp. 406-411.

International Search Report and Written Opinion for Application No. PCT/CN2013/073231 dated Dec. 26, 2013.

International Search Report for Application No. PCT/CN2011/078044 dated May 10, 2012.

Kelly et al., "Computationally tractable location estimation on WiFi enabled mobile phones", ISSC 2009, UCD, Jun. 10-11.

Kim et al., "Initial calibration of an inertial measurement unit using an optical position tracking system", Copyright 2004 IEEE, pp. 96-101.

Kourogi et al., "A method of pedestrian dead reckoning using action recognition", Copyright 2010 IEEE, pp. 85-89.

Lassabe et al., "Indoor Wi-Fi positioning: techniques and systems", Ann. Telecommun. (2009) 64:651-664.

Lee et al., "Recognition of walking behaviors for pedestrian navigation", Proceedings of the 2001 IEEE International Conference on Control Applications, pp. 1152-1155.

Lin et al., "Energy-accuracy trade-off for continuous mobile device location", Jun. 15-18, 2010, pp. 285-297.

Nelder et al., "A simplex method for function minimization", The Computer Journal, (1965) 7(4): 308-313.

Olivares et al., "HIgh-Efficiency Low-Cost Accelerometer-Aided Gyroscope Calibration", 2009 International Conference on Test and Measurement, pp. 354-360.

Perry, Tekla S., Navigating the Great Indoors, IEEE Spectrum, p. 20, Nov. 2012.

Woodman et al., "Pedestrian localisation for indoor environments", UbiComp'08, Sep. 21-24, 2008, Seaul, Korea.

Wu et al., "Gravity based online calibration for monolithic triaxial accelerometers' gain and offset drift", Proceedings of the 4th World Congress on Intelligent Control and Automation, Jun. 10-14, 2002, Shanghai, P.R. China.

Zhang et al., "Research and design of location tracking system used in underground mine based on WiFi technology", 2009 Inernational Forum on Computer Science-Technology and Applications.

Zhunag et al., "Improving energy efficiency of location sensing on smartphones", Copyright 2010 pp. 315-329.

\* cited by examiner

FIG. 10

| Timestamp 1010 | Status identifier from "DOWN" to "UP" 1020 | Status identifier from "UP" to "DOWN" 103₀ | Footstep determination 104₀ |
|---|---|---|---|
| $t_0=0.1$ | ✓ | | Starting 1ˢᵗ step |
| $t_1=0.4$ | ✓ | | |
| $t_2=0.6$ | | ✓ | Ending 1ˢᵗ step; starting 2ⁿᵈ step |
| $t_3=0.8$ | ✓ | | |
| $t_4=0.9$ | | ✓ | |
| $t_5=1.1$ | ✓ | | |
| $t_6=1.3$ | | ✓ | Ending 2ⁿᵈ step; starting 3ʳᵈ step |
| $t_7=1.7$ | ✓ | | |
| $t_8=1.9$ | | ✓ | Ending 3ʳᵈ step; starting 4ᵗʰ step |
| $t_9=2.4$ | ✓ | | |
| $t_{10}=2.7$ | | ✓ | Ending 4ᵗʰ step; starting 5ᵗʰ step |
| $t_{11}=2.9$ | ✓ | | |
| $t_{12}=3.1$ | | | Ending 5ᵗʰ step |

1000

US 9,295,027 B2

SIGNAL PROCESSING TO EXTRACT A PEDESTRIAN'S MOVING DIRECTION

CROSS-REFERENCE TO RELATED APPLICATION

The present application is a national phase entry under 35 U.S.C. §371 of International Application No. PCT/CN2013/073233 filed, Mar. 26, 2013, published in English, all of which is incorporated herein by reference.

BACKGROUND OF THE INVENTION

A user, such as a pedestrian, hiker, biker, swimmer, or runner, may use location based services available on a mobile device. Such services may include location positioning, location navigation, and location-aware searching, just to name a few. Some location based services may rely in part on a user's direction of movement.

However, existing technologies may fail to make an accurate determination of a user's direction of movement. For example, some existing technologies may approximate a general axis that the user is moving along, but do not determine which way along the axis the user is moving towards. For instance, some technologies may determine that the user is moving generally along a North-South direction, but cannot accurately determine whether the user is moving towards the North or South. Other technologies may determine a user's direction of movement based in part on movement of a mobile device. However, accurate determination of this movement may be difficult due to random noise introduced by the user, such as shaking or jittering of the mobile device.

BRIEF SUMMARY OF THE INVENTION

This document describes technologies, methods, systems, devices, and other mechanisms for determining a moving direction of a user of a mobile device, such as a handheld mobile phone, PDA, and tablet computer, etc.

One aspect of the disclosure provides a method for determining a moving direction of a user of a mobile device. A processor determines an acceleration signal associated with the mobile device. The acceleration signal has three dimensions including an x dimension extending generally along a North-South direction, a y dimension extending generally along an East-West direction, and a z dimension extending generally along a direction of Earth's gravity. The method fits the acceleration signal to a theoretical model, and determines the moving direction of the user based on the theoretical model. The theoretical model includes a sinusoidal function according to the following equation:

$$M(t) = A^* \sin(\omega t + \theta) + A_1,$$

where A represents an amplitude, t represents time, $\omega$ represents an angular frequency computed based on a step frequency of the user, $\theta$ represents a phase, and $A_1$ represents a shift of the sinusoidal function above zero.

Another aspect of the disclosure provides an apparatus for determining a moving direction of a user of a mobile device. The apparatus includes a memory and a processor in communication with the memory. The processor is configured to determine an acceleration signal associated with the mobile device. The acceleration signal has three dimensions including an x dimension extending generally along a North-South direction, a y dimension extending generally along an East-West direction, and a z dimension extending generally along a direction of Earth's gravity. The processor is also configured to fit the acceleration signal to a theoretical model, and determine the moving direction of the user based on the theoretical model. The theoretical model includes a sinusoidal function according to the following equation:

$$M(t) = A^* \sin(\omega t + \theta) + A_1,$$

where A represents an amplitude, t represents time, $\omega$ represents an angular frequency computed based on a step frequency of the user, $\theta$ represents a phase, and $A_1$ represents a shift of the sinusoidal function above zero.

Yet another aspect of the disclosure provides an apparatus for determining a moving direction of a user of a mobile device. The apparatus comprises a means for determining an acceleration signal associated with the mobile device. The acceleration signal has three dimensions including an x dimension extending generally along a North-South direction, a y dimension extending generally along an East-West direction, and a z dimension extending generally along a direction of Earth's gravity. The apparatus includes a means for fitting the acceleration signal to a theretical model, and a means for determining the moving direction of the user based on the theoretical model. The theoretical model includes a sinusoidal function according to the following equation:

$$M(t) = A^* \sin(\omega t + \theta) + A_1,$$

where A represents an amplitude, t represents time, $\omega$ represents an angular frequency computed based on a step frequency of the user, $\theta$ represents a phase, and $A_1$ represents a shift of the sinusoidal function above zero.

The apparatus may include a means for providing acceleration readings associated with the mobile device. The apparatus may also include a means for providing orientation of the mobile device. The apparatus may include a means for determining the acceleration signal based on the acceleration readings and the orientation. The apparatus may include a means for determining the step frequency of the user based on the acceleration signal.

The means for fitting the acceleration signal may fit the acceleration signal in the x and y dimensions to sinusoidal functions $M_x(t)$ and $M_y(t)$, respectively. Each of the sinusoidal functions $M_x(t)$ and $M_y(t)$ may be based on the sinusoidal function M(t).

The apparatus may include a means for determining at least one possible moving direction. The means may determine amplitudes and phases of the functions $M_x(t)$ and $M_y(t)$. The means may model acceleration in the moving direction using a sinusoidal function $M_\alpha(t)$, where $\alpha$ indicates the moving direction. The means may determine a parameter of the function $M_\alpha(t)$ based on the determined amplitudes and phases of the functions $M_x(t)$ and $M_y(t)$. The means may determine the at least one possible moving direction based on the function $M_\alpha(t)$. The means may determine the at least one possible moving direction based on an amplitude of the function $M_\alpha(t)$.

Still yet another aspect of the disclosure provides a method of determining a step frequency of a user of a mobile device. A processor determines an acceleration signal associated with the mobile device. The acceleration signal has three dimensions including an x dimension extending generally along a North-South direction, a y dimension extending generally along an East-West direction, and a z dimension extending generally along a direction of Earth's gravity. A starting time for each footstep is determined when the acceleration signal in the z dimension exceeds a threshold. An ending time for each footstep is determined when the acceleration signal in the z dimension subsequently exceeds the threshold. The time for each footstep is determined by determining a lapse of time between its starting time and its ending time. The step frequency is determined based on time for a plurality of footsteps.

A further aspect of the disclosure provides an apparatus for determining a step frequency of a user of a mobile device. The apparatus comprises a memory and a processor in communication with the memory. The processor is configured to determine an acceleration signal associated with the mobile device. The acceleration signal has three dimensions including an x dimension extending generally along a North-South direction, a y dimension extending generally along an East-West direction, and a z dimension extending generally along a direction of Earth's gravity. The processor determines a starting time for each footstep when the acceleration signal in the z dimension exceeds a threshold. The processor determines an ending time for each footstep when the acceleration signal in the z dimension subsequently exceeds the threshold. The processor determines the time for each footstep by determining a lapse of time between its starting time and its ending time, and determines the step frequency based on time for a plurality of footsteps.

A yet further aspect of the disclosure provides an apparatus for determining a step frequency of a user of a mobile device. The apparatus comprises a means for determining an acceleration signal associated with the mobile device. The acceleration signal has three dimensions including an x dimension extending generally along a North-South direction, a y dimension extending generally along an East-West direction, and a z dimension extending generally along a direction of Earth's gravity. The apparatus comprises a means for determining a starting time for each footstep when the acceleration signal in the z dimension exceeds a threshold. Additionally, the apparatus comprises a means for determining an ending time for each footstep when the acceleration signal in the z dimension subsequently exceeds the threshold. The apparatus also comprises a means for determining the time for each footstep by determining a lapse of time between its starting time and its ending time. The apparatus further comprises a means for determining the step frequency based on time for a plurality of footsteps.

In one example, the apparatus may include a means for providing acceleration readings associated with the mobile device. The apparatus may include a means for providing orientation of the mobile device. The apparatus may include a means for determining the acceleration signal based on the acceleration readings and the orientation of the mobile device. The means for determining the step frequency may determine time for a predetermined number of footsteps. The threshold may be 10.3 m/s².

Another aspect of the disclosure provides a method of determining a moving direction of a user of a mobile device. A processor determines an acceleration signal associated with the mobile device. A step frequency of the user is determined based on the acceleration signal. The method models a moving acceleration of the user based on the acceleration signal and the step frequency, and determines the moving direction based on the moving acceleration.

Yet another aspect of the disclosure provides an apparatus of a mobile device. The apparatus comprises a memory and a processor in communication with the memory. The processor is configured to determine an acceleration signal associated with the mobile device. The processor is also configured to determine a step frequency of the user based on the acceleration signal. A moving acceleration of the user is modeled based on the acceleration signal and the step frequency. The processor is configured to determine the moving direction based on the moving acceleration.

Still yet another aspect of the disclosure provides an apparatus of a mobile device. The apparatus comprises a means for determining an acceleration signal associated with the mobile device. The apparatus further comprises a means for determining a step frequency of the user based on the acceleration signal. The apparatus also comprises a means for modeling a moving acceleration of the user based on the acceleration signal and the step frequency, and a means for determining the moving direction based on the moving acceleration.

In this aspect, the acceleration signal may have three dimensions, including an x dimension extending generally along a North-South direction, a y dimension extending generally along an East-West direction, and a z dimension extending generally along a direction of Earth's gravity.

The means for modeling the moving acceleration uses a sinusoidal function according to the following equation:

$$M(t)=A^*\sin(\omega t+\theta)+A_1,$$

where A represents an amplitude, t represents time, ω represents an angular frequency computed based on the step frequency of the user, θ represents a phase, and $A_1$ represents a shift of the sinusoidal function above zero.

The means for modeling the moving acceleration fits the acceleration signal in the x and y dimensions to sinusoidal functions $M_x(t)$ and $M_y(t)$ based on the sinusoidal function M(t), respectively. The means determines amplitudes and phases of the functions $M_x(t)$ and $M_y(t)$. The means models acceleration in the moving direction using a sinusoidal function $M_\alpha(t)$, where α represents the moving direction. The means determines an amplitude of the function $M_\alpha(t)$ based on the determined amplitudes and phases of the functions $M_x(t)$ and $M_y(t)$. The means determines at least one possible moving direction based on the amplitude of the function $M_\alpha(t)$.

The foregoing summary is illustrative only and is not intended to be in any way limiting. In addition to the illustrative aspects, embodiments, and features, described above, further aspects, embodiments, and features will become apparent by reference to the drawings and the following detailed description.

BRIEF DESCRIPTION OF THE DRAWINGS

In the drawings, similar reference numbers and acronyms may identify elements or acts with the same or similar functionality for ease of understanding and convenience, unless context dictates otherwise.

FIG. 10 is an example table illustrating identification of footsteps from FIG. 9.

DETAILED DESCRIPTION

The following description provides specific details of embodiments of the technologies detailed herein. Well known structures and function have not been shown or described in detail to avoid unnecessarily obscuring the description. References to "one embodiment," "an embodiment," "one aspect," "an aspect," "one example," "an example," and the like do not necessarily refer to the same embodiment, aspect or embodiment, although they may.

The headings and subheadings provided herein are for convenience and ease of reading only.

1. OVERVIEW

Figure 1:
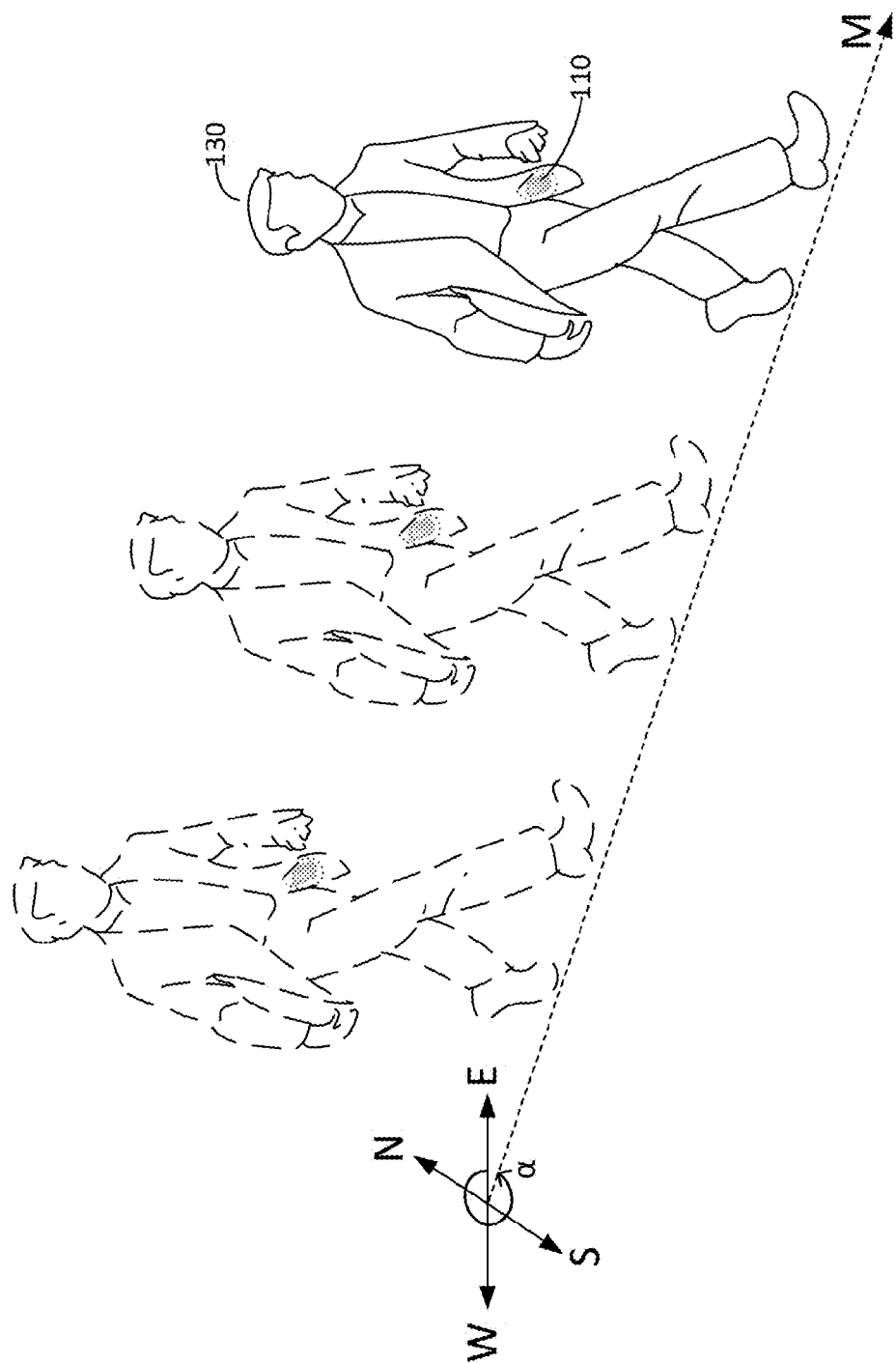
FIG. 1 is a prospective view of a user moving in an example direction.

The technologies described herein generally relate to the determination of a user's direction of movement based at least in part on readings collected by a mobile device. As illustrated in FIG. 1, a mobile device 110 may be mounted on or carried in an object associated with a user 130, such as in a pocket, or in a purse, among other possibilities. Alternatively, the mobile device may be connected to the user, such as worn on the user's belt or shoe, or held in a hand, among other possibilities.

Regardless of how the mobile device is positioned relative to the user, the mobile device moves relative to the Earth as the user moves. Such vibration motion may be attributed, at least in part, to the user's physical movement, e.g., walking or running. The vibration motion may also be attributed to noise resulting from the user's physical movement. Such noise may include, but not limited to, random shaking or jittering of the mobile device.

One aspect of the technologies relates to a determination of the user's direction of movement based on the vibration motion of a mobile phone with noise cancelled therefrom. A triangle function fitting mechanism (hereinafter, the "TFF") may be used to analyze one or more aspects of the vibration motion and removes noise therefrom. In one embodiment, the TFF determines a frequency of the user's physical movement, e.g., a step frequency. Any vibration motion outside of the step frequency is regarded as noise. The TFF models one aspect of the vibration, e.g., acceleration, at the step frequency, and analyzes the user's direction of movement based on the model. With regard to the modeling process, the TFF models the acceleration using a sinusoidal function. Parameters of the function are determined by fitting actual accelerations of the mobile device to the sinusoidal function at the step frequency. The TFF determines the user's direction of movement during the above processor.

As illustrated in FIG. 1, the user's direction of movement may be represented in the form of an angle $\alpha$ between the heading of the user 130 "M" and a cardinal direction. The cardinal direction may be any one of the East, West, North, and South directions. The angle $\alpha$ may be in a range between 0° and 360°. For clarity, FIG. 2A is a planar view of the user's movement shown in FIG. 1. In FIG. 2A, $\alpha$ is an angle between the direction of the user's movement and the East direction, where:

$\alpha$=0°, the user is moving towards the East;
$\alpha$=90°, the user is moving towards the North;
$\alpha$=180°, the user is moving towards the West;
$\alpha$=270°, the user is moving towards the South;
$\alpha$=330°, the user is moving towards 30° to the South of East.

The user's direction of movement as illustrated in FIGS. 1 and 2A is merely illustrative and is not intended to be limiting. Specific examples for determining the user's direction of movement, namely, the angle $\alpha$, are provided herein below.

In situations in which the systems discussed herein may collect or use information about a user, the user may be provided with an opportunity to control such collection and usage. Such information may include the current location of the user. The user may have control over how information is collected and how such information may be used by a content server. In one example, the user may refuse to grant a system, including a program or a feature, to collect user-related information. In another example, the user may control how a system receives content from a content server, where the content is relevant to the user. In addition, certain data may be treated in one or more ways before storage or usage, so that information pertaining to the user is removed. For example, the user's identity may be removed so that no personally identifiable information can be determined about the user. In another example, the user's geographic location may be generalized to a city, ZIP code, or state level, so that a detailed location of the user cannot be determined.

2. EXAMPLE SYSTEM

Figure 3:
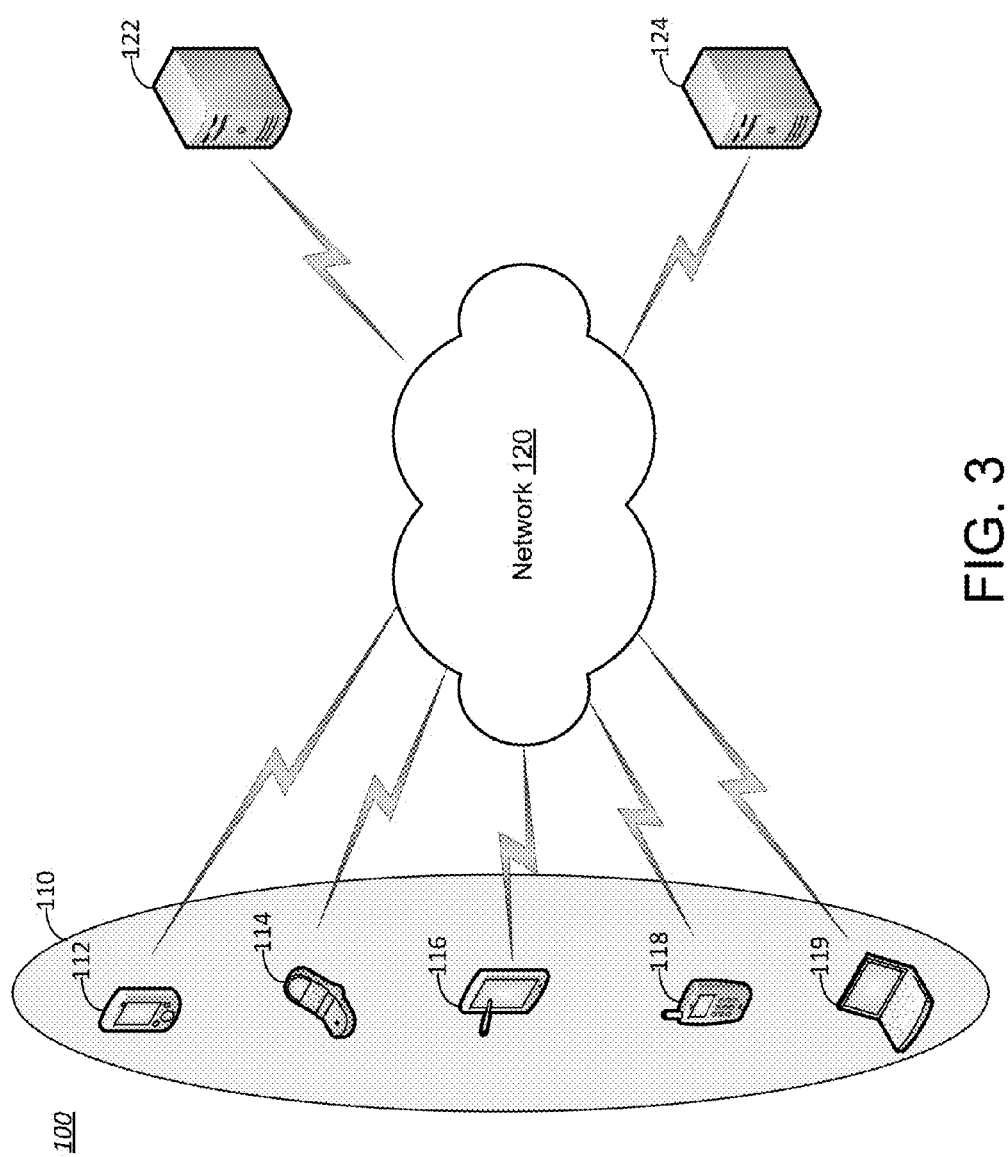
FIG. 3 illustrates an example system in accordance with aspects of the disclosure.

FIG. 3 is a simplified schematic diagram of an example system 100 in which the mechanism about determining a user's direction of movement may be implemented.

As shown, the system 100 may include a mobile device 110 communicatively linked with a network 120. The mobile device 110 may be able to communicate with other devices via the network 120 through the use of one or more wireless connections, wired connections or a combination thereof. For instance, the network 120 may provide connectivity between the mobile device 110 and one or more servers 122, 124.

The number of mobile devices and servers shown in FIG. 3 is merely illustrative and is not intended to be limiting. Other numbers of the mobile devices or servers are possible as well.

By way of example and without limitation, the mobile device 110 may be a Personal Digital Assistant (PDA) 112, a cell phone 114, a tablet computer 116, a smart phone 118, or a laptop computer 119. The mobile device 110 may also take on forms other than those illustrated in FIG. 3. For instance, other examples of the mobile device 110 may include, without limitation, a remote control, a music player, a media player device, a media recorder, a gaming device, a still camera, a video camera, a web cam, a car key fob, a global positioning system, and a wearable computing system (e.g., glasses, any type of near eye display unit, or a head-mounted display).

Server 122 may comprise a single computing device or a cluster-based computing platform, where a number of computers are clustered together. The computers may be physically proximate to one another. For instance, the computers may be positioned on one or more adjacent racks. The computers may also be interconnected to one another by a network switching system that includes one or more switches or routers. One or more related applications may be distributed or replicated among the various computers. One or more servers 122, 124 may be clustered together. The servers 122, 124 may work independently from or collaboratively with each other.

The server 122 may communicate with the mobile device 110, according to one or more network protocols and application-level protocols, to facilitate the use of network-based or cloud-based computing on the mobile device 110.

The mobile device 110 and the servers 122, 124 are considered as nodes on the network 120. The network 120 may comprise routers, switches, gateways, and other devices to facilitate communication of data from one node to another. The network 120 may facilitate direct or indirect communication between the mobile device 110 and the server 122. For instance, the network 120 may route and propagate information between the mobile device 110 and the server 122.

The network 120 may comprise any number of networks including but not limited to the Internet, private networks, personal area networks, local area networks, server provider core networks, metropolitan area networks, wide area networks, and the like. The network 120 may be, e.g., a wireless network, such as the Global System for Mobile Communications/General Packet Radio service (GSM/GPRS), Code Division Multiple Access (CDMA), Enhanced Data Rates for Global Evolution (EDGE), Universal Mobile Telecommunications System (UMTS), or a broadband network such as Bluetooth and Wi-Fi (the brand name for products using IEEE 802.11 standards). Alternatively, the network 120 may be a wired network. Devices, apparatuses, components, units, and the like, within the network 120, may be coupled to each other via a serial bus such as a Universal Serial Bus (USB) or a parallel bus.

The system 100 may detect a user's moving direction using a centralized computing mechanism or a distributed computing mechanism.

In a centralized computing mechanism, the methods, processes, and techniques disclosed herein may be able to operate entirely on one device alone, e.g., the mobile device 110. For instance, the mobile device 110 may independently store and execute logic to determine the user's direction of movement. The logic generally refers to signals that may be applied to affect operation of a device. Logic may be embodied in computer-readable instructions (e.g., software), circuits, or a combination thereof, among other possibilities.

In a distributed computing mechanism, the methods, processes, and techniques disclosed herein may be distributed among various devices, e.g., between the mobile device 110 and one or more servers 122. In one example, the mobile device 110 and the server 122 may share storage, analysis and processing operations. In another example, the server 112 may offload some processing and storage responsibilities of the mobile device 110. The server 122 may store application data that is used to facilitate the operation of one or more applications performed by the mobile device 110. Some or all information of the mobile device 110 may be transmitted to the server 122 for analysis, processing and storage. As such, the design and requirements of the mobile device 110 may be simplified.

For simplicity of illustration and explanation, the present disclosure will primarily focus on the centralized computing mechanism, e.g., by the mobile device 110 alone, from this point forward. However, methods, processes, and techniques described herein may be applied by analogy to the distributed computing mechanism and other computing mechanisms.

3. EXAMPLE EMBODIMENTS OF A MOBILE DEVICE

Figure 4:
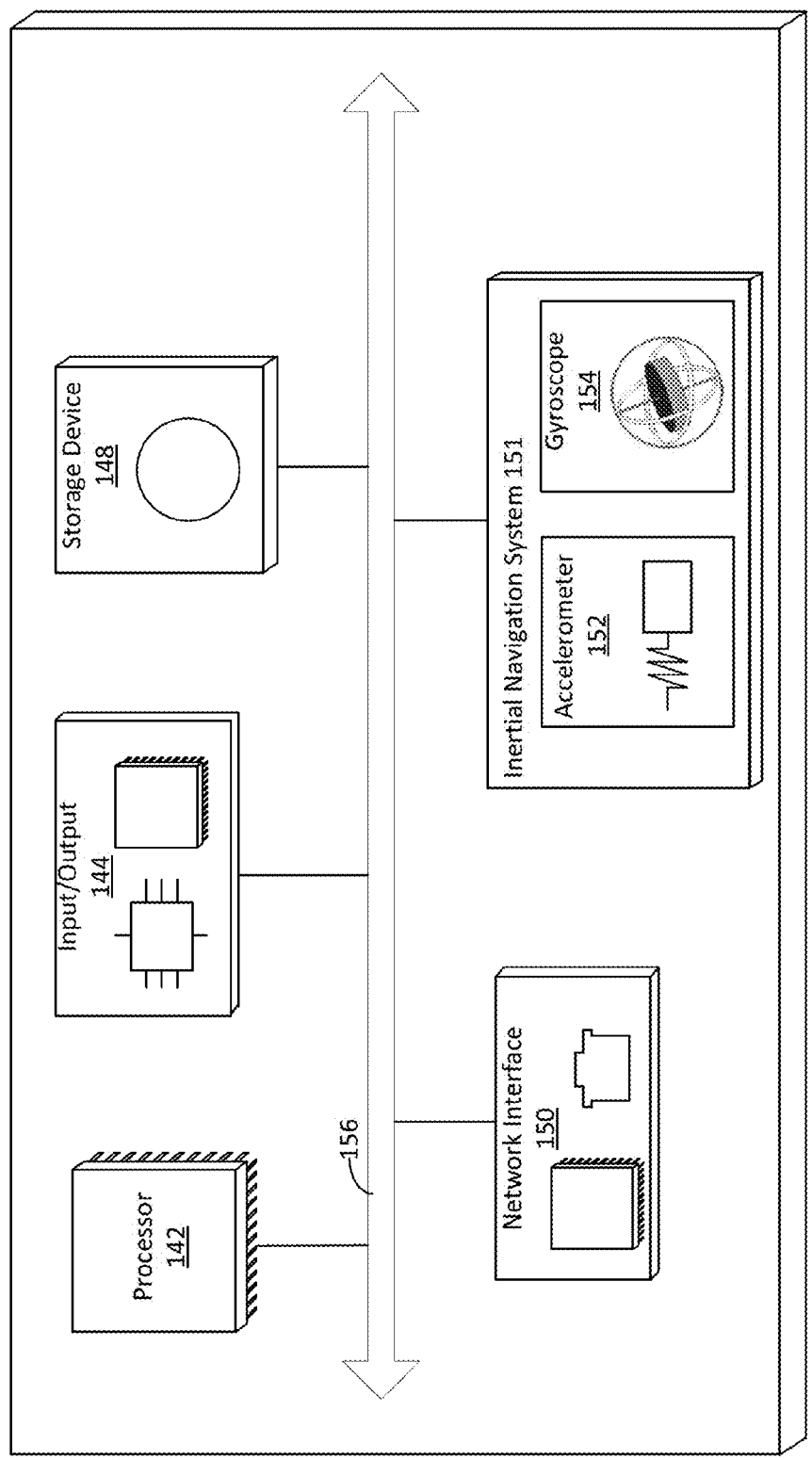
FIG. 4 is an example component diagram of a mobile device in accordance with aspects of the disclosure.

FIG. 4 is a simplified schematic diagram showing some of the components of an example mobile device 110. The mobile device 110 may include one or more of the following components: a processor 142, an input/output device 144, a storage device 148, a network interface 150, and an inertial navigation system 151 (INS). Components of the mobile device 110 may be communicatively coupled together in either a wired or wireless fashion. In one example as illustrated in FIG. 4, the components may be coupled together by a system bus 156. Detailed description of some example components of the mobile device is as follows.

3.1 Processor

The processor 142 may control functions of the mobile device 10. For instance, the processor 142 may be configured to execute logic to determine the user's direction of movement. Detailed implementations with regard to the logic are described in connection with FIG. 6-16. In addition to determining the user's direction of movement, the processor 142 may process other functions, such as executing a geo-location related application after determining the user's direction of movement.

The processor 142 may be of any type including but not limited to a general purpose processor and a special purpose or dedicated processor, e.g., an application specific integrated circuit (ASIC), a digital signal processor (DSP), a graphical processing unit (GPU), a floating point processing unit (FPU), and the like. The processor 142 may refer to a single processor, or a collection of processors of the same type or various types.

The processor 142 may communicate with individual components of the mobile device 110. In one example, the processor 142 may act upon input signals provided by the input/output device 144. For instance, the processor 142 may rely on the user input to control when the mobile device 110 should determine the user's direction of movement. The processor 142 may also be configured to receive readings from the INS 151, analyze the readings, and perform algorithms based on the readings.

The processor 142 may execute computer-readable instructions or other instructions stored in the storage device 148. After determining the user's direction of movement, the processor 142 may output the result to the input/output device 144.

3.2 Input/Output Device

The input/output device 144 may facilitate device interaction with a user, and may take various forms. The input/output device 144 may include a set of peripherals configured to provide input and output to and from a user of the mobile device 110.

By way of example, the input/out device 144 may include input components such as a keyboard, keypad, touch pad, point device, track ball, joystick, voice recognition device, touch-sensitive surface, microphone, digital camera, mouse, buttons, switch, scroll-wheel, scanner, Global Positioning System (GPS) receiver, movement sensor, location sensor, infrared sensor, optical sensor, Radio Frequency identification (RFID) system, and wireless sensor, among others. The device 144 may provide a number of different types of input data, such as audio data from a microphone, text data from a keypad, video or image data from a camera, and gesture data from a touchpad, just to name a few.

The device 144 may also include output components such as a display, audio transducer, light indicator, tactile transducer, printer, light bulb, and vibration generator, among others.

The display may be any type of display including but not limited to a liquid crystal display (LCD), cathode ray tube display (CRT), light emitting diode display (LED), digital light processing display (DLP), plasma, optical see-through display, optical see-around display, video-see-through display, heads-up display, head-mounted display, flat-panel display, electroluminescent display (ELD), and organic LED (OLED) display, among other possibilities.

The audio transducer may take any form including but not limited to a speaker, headset, jack, earphone, and audio output port, among other possibilities.

Figure 17:
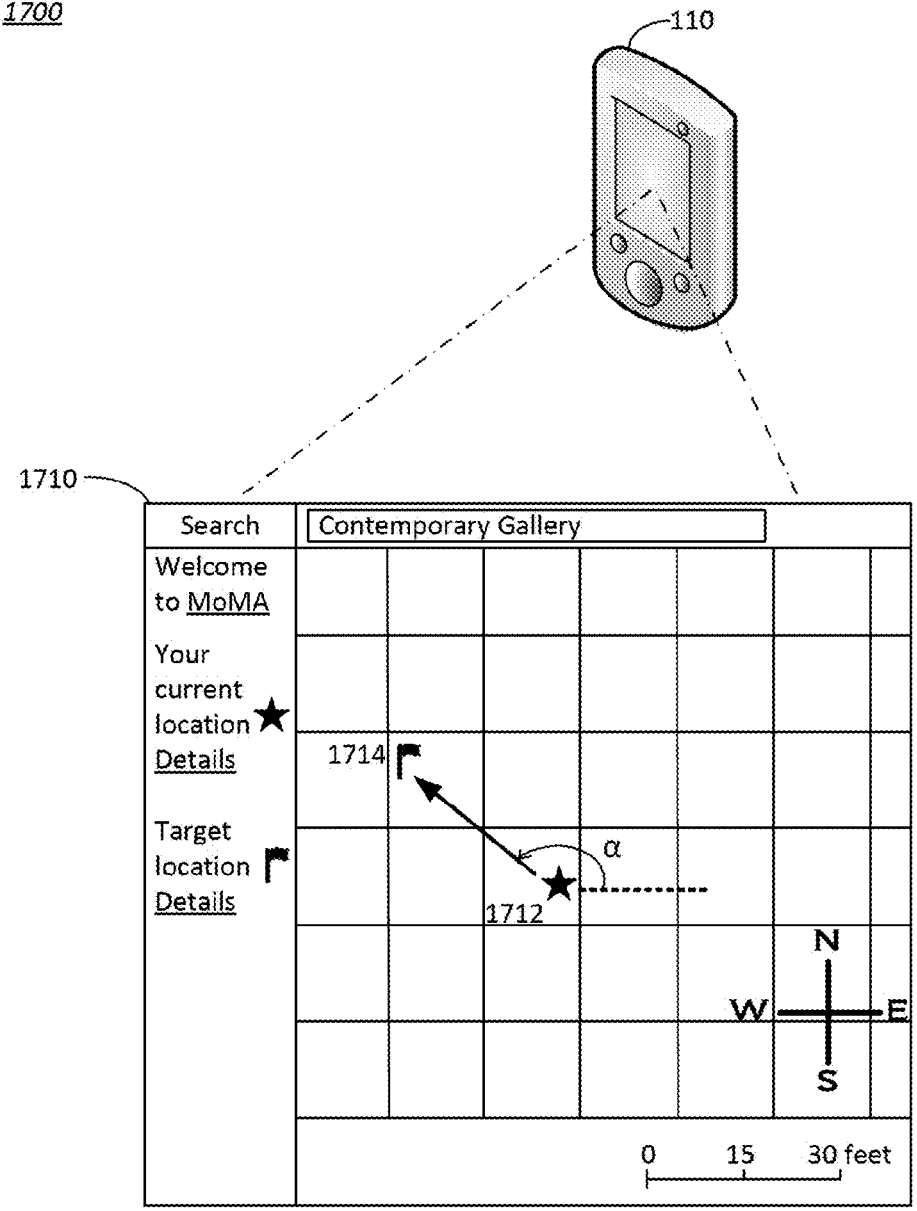
FIG. 17 is an example user interface display of a mobile device.

The device 144 may provide a number of different types of output data, such as visual output via a display, audio output via a speaker, and tactile output via a vibration generator, among others. FIG. 17 provides an example of a visual output shown on a display 1710 of the mobile device 110. In this example, by viewing the display 1710, the user may visualize its direction of movement relative to a target position.

3.3 Storage Device

The storage device 148 provides storage for the mobile device 110 by using one or more non-transitory computer-readable media. A computer readable medium may be a computer-readable storage medium, a tangible storage device, an article of manufacture, or the like. One or more computer readable media may store volatile data, non-volatile data, or a combination thereof.

Some computer readable media may store data for a short period of time. Other computer readable media may store data persistently for a long period of time.

One or more computer-readable media may include primary storage, secondary storage, or a combination thereof. The primary storage may be simply referred to as memory, which is directly accessed by the processor 142. The secondary storage differs from the primary storage in that it is not directly accessible by the processor 142. Rather, data on the secondary storage needs to be transferred to the primary storage in order to be accessed by the processor 142.

The storage device 148 may include one or more computer-readable media of different types. Different types of the computer-readable media may include random-access memory (e.g., SRAM and DRAM), read-only memory (e.g., Mask ROM, PROM, EPROM, and EEPROM), non-volatile random-access memory (e.g. flash memory), a magnetic storage medium, an optical disc, a memory card, a Zip drive, a register memory, a processor cache, a solid state drive (SSD), and a redundant array of independent disks (RAID), among other possibilities The storage device 148 may include one or more computer-readable instructions, data, applications, processes, threads of applications, program modules, software, and the like, that are accessible or executable by the processor 142 to perform at least part of the herein-described methods and techniques.

By way of example, the computer-readable instructions in the storage device 148 may include logic that determines a user's direction of movement. One example of such logic is the TFF process. The TFF process analyzes an aspect of the vibration motion, e.g., acceleration, and removes noise from the vibration motion. More specifically, the TFF process may include one or more of the following: (i) determining a frequency of the user's physical movement, (ii) modeling acceleration using a sinusoidal function, (iii) fitting actual accelerations of a mobile device to the sinusoidal function at the step frequency, and (iv) determining the user's direction of movement based on the model.

Examples of data stored in the storage device 148 may include but not limited to variables, images, and database information. Specific data related to the determination of the user's direction of movement may include, but not limited to, readings from the INS 151, possible moving directions, status identifiers of footsteps, step frequency, timestamps associated with the footsteps, step count, and step threshold, among other possibilities. The processor 142 may read and write the data during execution of the computer-readable instructions.

3.4 Network Interface

The network interface 150 allows the mobile device 110 to communicate, using analog or digital modulation, with other devices or servers 122, on a network, such as the network 120. The network interface 150 may include transmitters, receivers, and antennas, among others, to enable communication via the network 120. The network interface 150 may take the form of a wireless interface, a wireline interface, or a combination thereof, through which the mobile device 110 can connect to the network 120.

A wireless interface may include one or more wireless transmitters, receivers, transceivers, and the like, configurable to communicate to a wireless network using one or more wireless communication standards. Example wireless transceivers may include but not limited to a BLUETOOTH® transceiver, a Zigbee transceiver, a Wi-Fi transceiver, a WiMAX transceiver, and an infrared transceiver, among other possibilities. Example wireless communication standards include but not limited to BLUETOOTH®, Wi-Fi (802.11), 3G cellular communication standards (e.g., GSM, GPRS, CDMA, EV-DO, and/or HSPDA), and 4G cellular communication standards (e.g., LTE and WiMAX (802.16)), among other possibilities.

A wireline interface may include one or more wireline transmitters, receivers, transceivers, and the like, configurable to communicate via a twisted pair wire, a coaxial cable, a fiber-optic link, or a similar physical connection to a wireline network. Example wireline transceivers may include but not limited to an Ethernet transceiver and a Universal Serial Bus (USB) transceiver.

3.5 Inertial Navigation System (INS)

Referring to FIG. 4, the INS 151 may include, but is not limited to, onboard motion-sensing components such as an accelerometer 152 and a gyroscope 154. Although not illustrated, the INS 151 may also include a magnetic sensor, a compass, a magnetic field detector, and a temperature sensor such as a thermometer, among other possibilities.

The accelerometer 152 may be a single measurement device or a combination of measurement devices of various types. By way of example, the accelerometer 152 may be piezoelectric, optical, resistive, capacitive, shear mode, strain gauge, surface acoustic wave, laser, and MEMS, among other possibilities.

The accelerometer 152 may measure the acceleration of gravity of the mobile device 110. Specifically, the accelerometer 152 may output readings of a linear acceleration of the mobile device 110. The processor 142 may access readings from the accelerometer 152 as needed when executing the computer-readable instructions.

Figure 5C:
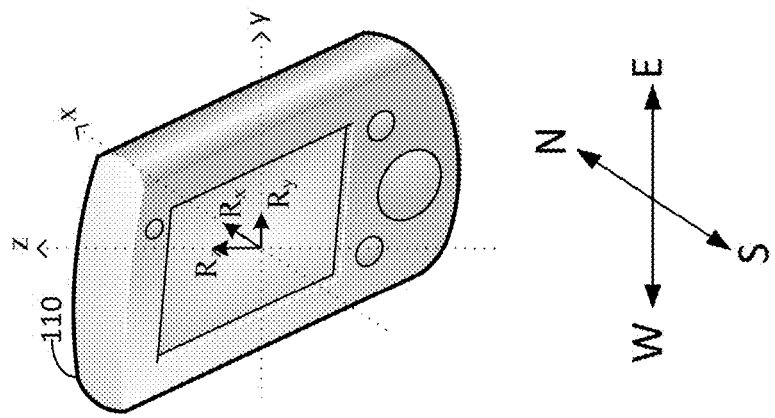
FIG. 5C is another view of the mobile device of FIG. 5A with an absolute acceleration signal.
Figure 5B:
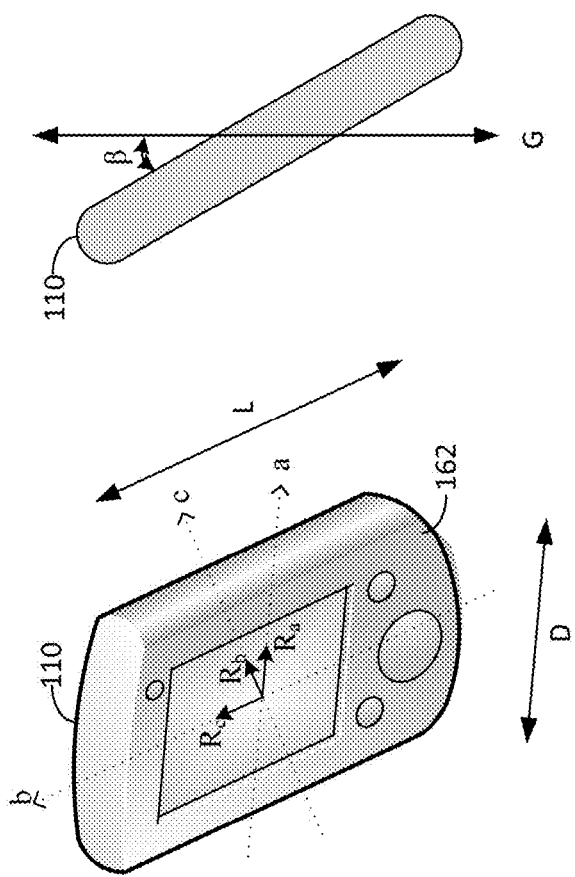
FIG. 5B is an example side view of the mobile device of FIG. 5A.
Figure 5A:
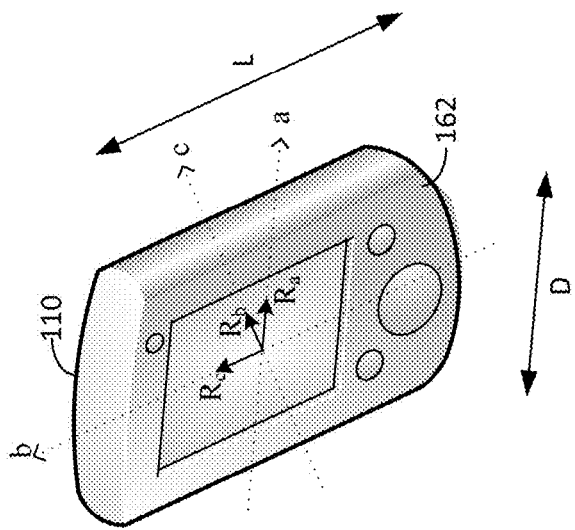
FIG. 5A is an example view of a mobile device with a raw acceleration signal.

With reference to FIG. 5A, the accelerometer 152 may output a 3-tuple acceleration value ($R_a$, $R_b$, $R_c$). By way of example, the acceleration value may be a point in a 3-dimensional Cartesian coordinate system that has three axes a, b, and c. The Cartesian system may be a framework relative to a front face 162 of the mobile device 110, such that a first axis "a" extends along a widthwise direction "D" of the mobile device 110, a second axis "b" extends along a lengthwise direction "L" of the mobile device 110, and a third axis "c" is perpendicular to the front face 162 of the mobile device 110.

The gyroscope 154 may be of various types including but not limited to a microelectromechanical system (MEMS) gyroscope, a fiber optic gyroscope, and the like. The gyroscope 154 may output readings to facilitate a determination of an orientation of the mobile device 110. The gyroscope 152 may provide an angular velocity of the mobile device 110 which may indicate a rate of an angular change of the mobile device 110. Based on the angular velocity, an absolute orientation of the mobile device 110 may be derived. In one example as shown in FIG. 5B, the mobile device 110 is oriented such that it forms an angle β with respect to the direction of the Earth's gravity. The angle β may be in a range between 0° and 90°. In one example, when β equals 30°, the mobile device 110 is tilted 30° relative to the direction of the Earth's gravity.

3.6 Variation of Components

The components of the mobile device 110 discussed with reference to FIG. 4 are merely illustrative, and are not intended to be limiting. One or more of the components may be combined.

In some examples, additional functional or physical components may be added to the example illustrated in FIG. 4. For instance, the mobile device 110 may include a geographic position component, e.g., a global positioning system (GPS) transceiver. The GPS transceiver may provide real-time location information of the mobile device 110 to the processor 142. In particular, the GPS transceiver may receive signals from a global satellite positioning system, and facilitate a determination of the location of the mobile device including but not limited to the proximate altitude, longitude and altitude positions of the mobile device 110. Other example components that the mobile device 110 may include are infrared sensors, optical sensors, Radio Frequency identification (RFID) systems, and wireless sensors, among other possibilities.

One or more components of the mobile device 110 may be physically separate from the mobile device 110 or physically distant from the remaining components. For instance, the INS 151 may be separate from, but remotely connected to, the remaining components of the mobile device 110. In another example, the INS 151 may be integrated into a first part, and the remaining components of the mobile device 110 may be integrated into a second part. Both parts may be physically coupled to each other. Other arrangements of the components of the mobile device 110 are also possible.

4. EXAMPLE SERVER

The server 122 may refer to a single computing device residing in a single computing center, or may refer to multiple computing devices residing in one or multiple computing centers at disparate geographic locations.

Although not specifically illustrated, the server 122 may for example include one or more of the following components: a processor, an input/output device, a storage device, and a network interface, among other possibilities. One or more of the above components may have characteristics similar to that of the mobile device 110.

The server 122 may store computer-readable instructions, data, applications (e.g., cloud-based applications), processes, threads of applications, program modules, software, services, and the like, that are accessible via the network 120.

5. EXAMPLE LOGIC AND METHODS OF OPERATION

As described earlier, the mobile device 110 may include a TFF system that implements the TFF process to determine a user's direction of movement by analyzing one or more aspects of the vibration motion detected by the mobile device 110.

One of the related principles in connection with the TFF process is the Vibration Energy Model (VEM). The VEM is based on the Equipartition theorem, which states that energy is shared equally among all degrees of freedom. In practice, a mobile device using VEM may compute a pedestrian's moving direction in the energy domain by using signals collected from the INS.

The TFF system may be implemented by Application specific Integrated Circuits (ASICs), Field Programmable Gate Arrays (FPGAs), digital signal processors (DSPs), integrated circuits, modules, segments, computer-readable instructions, firmware, or a combination thereof, among other possibilities. Further, the TFF system may be implemented in a signal bearing non-transitory medium in a variety of forms.

Figure 6:
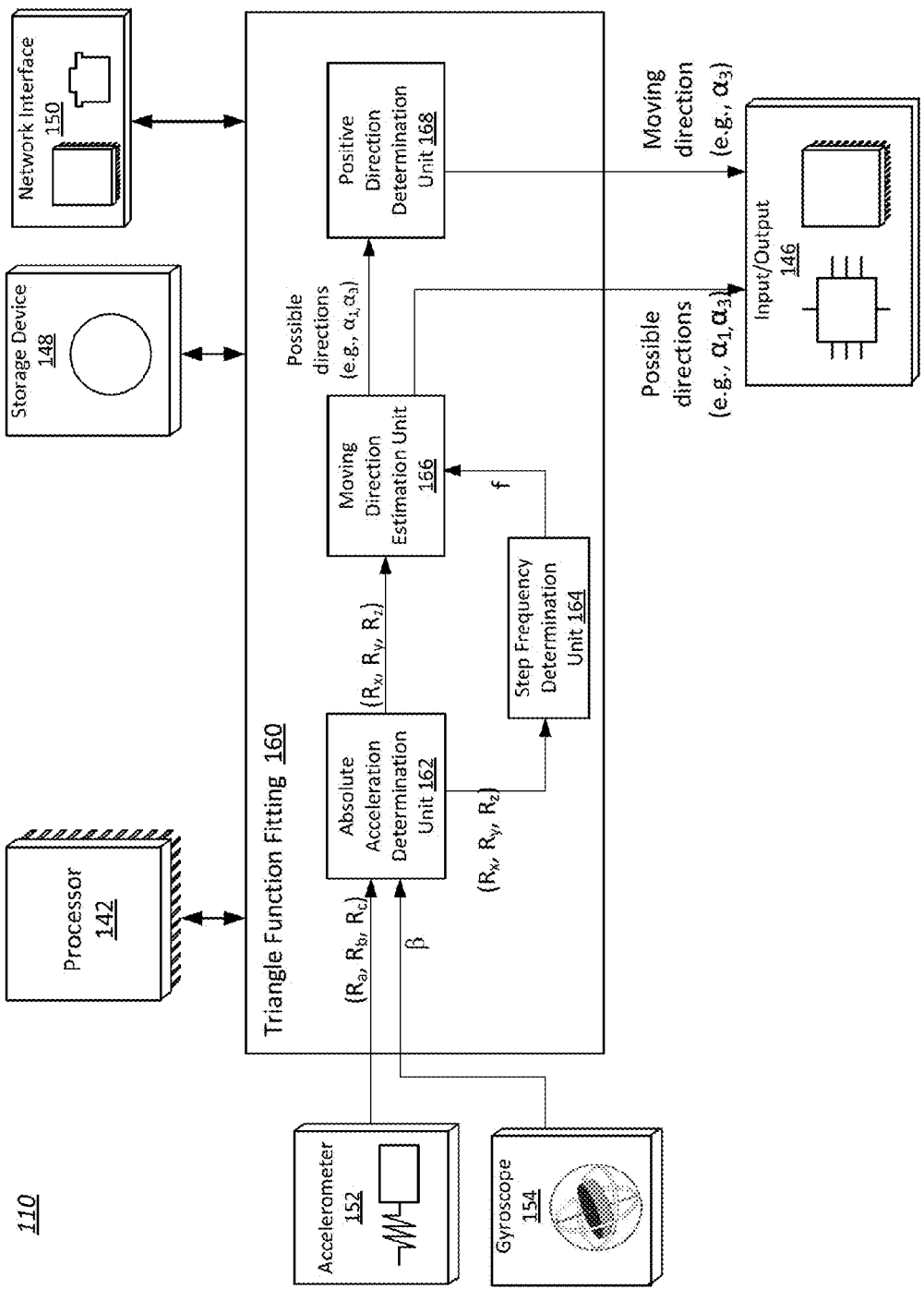
FIG. 6 is a block diagram of an example implementation of a triangle function fitting mechanism (TFF).

FIG. 6 shows an example of the mobile device 110 that implements the TFF system 160. As shown in FIG. 6, the TFF system 160 may include one or more of the following units: an absolute acceleration determination unit 162, a step frequency determination unit 164, a moving direction estimation unit 166, and a positive direction determination unit 168.

Methods of operation performed by the TFF system 160 and its individual units 162-168 are discussed in connection with the flow charts illustrated in FIGS. 7-8 and 11-14. Methods illustrated in one or more of the flow charts may be executed by a processor, e.g., the processor 142. In some examples, methods illustrated in each flow chart may be carried out periodically, continuously, as needed, as triggered, or in another manner.

As shown in the flow charts, each method may include one or more operations, functions, or actions as illustrated by one or more of the blocks. A block may represent a process of information, a transmission of information, or a combination thereof. As an example, a block may be implemented by circuitry, modules, segments, computer-readable instructions, or a combination thereof.

The flow charts discussed below are merely illustrative and are not intended to be limiting. For instance, although the blocks are illustrated in a sequential order, these blocks may also be performed in parallel or in a different order than those described herein, depending on the functionalities involved. Also, the various blocks may be combined into fewer blocks, divided into additional blocks, or omitted based upon the desired implementation. Further, blocks illustrated in various flow charts may be combined with one another, in part or in whole, based on the functionalities involved.

Figure 7:
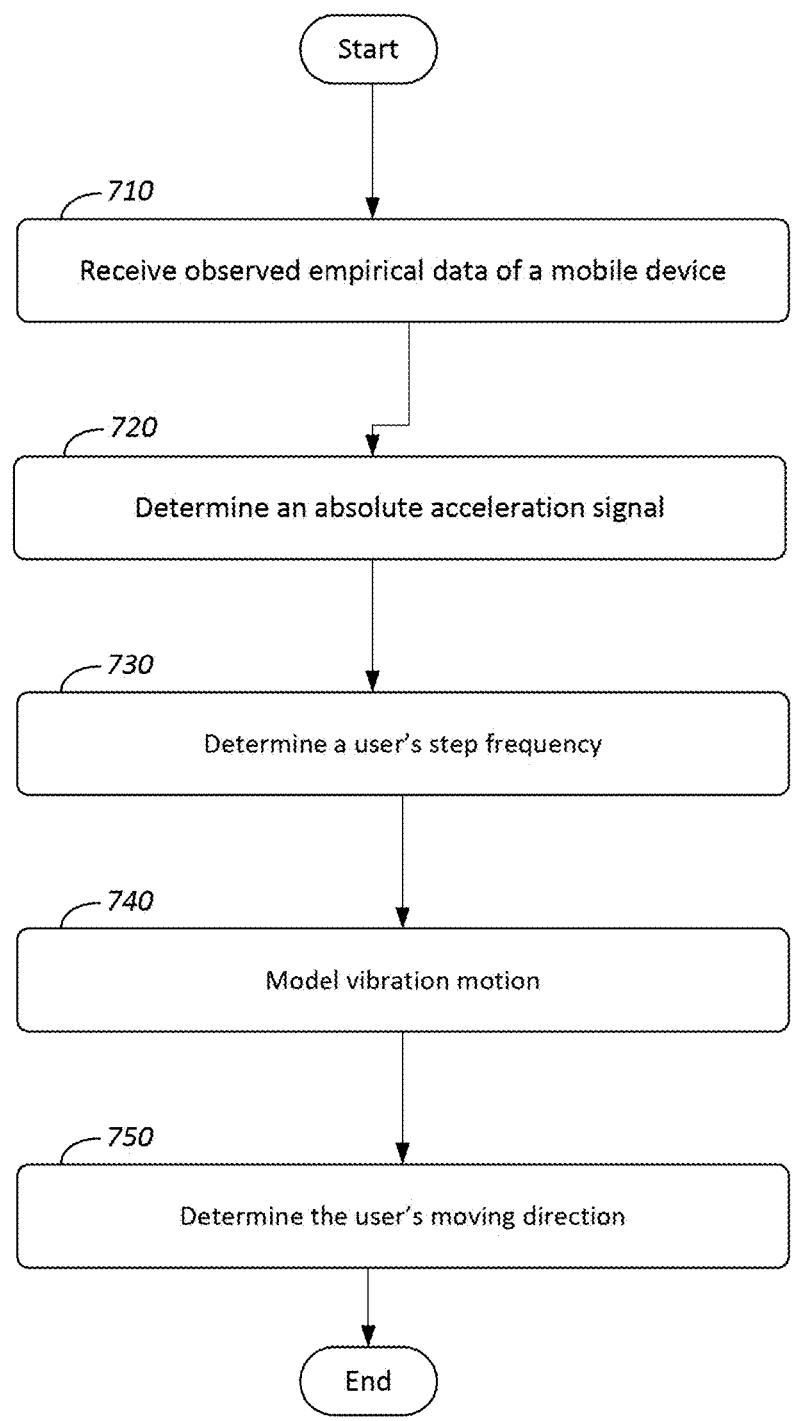
FIG. 7 is an example flow diagram of a process by the TFF.

FIG. 7 is a flow chart that illustrates an embodiment of an overall method of operation of the TFF system 160. At block 710, the absolute acceleration determination unit 162 may receive observed empirical data from the INS 151. The data may include a raw acceleration reading, e.g., ($R_a$, $R_b$, $R_c$), provided by the accelerometer 152. The data may also include a detected orientation of the mobile device 110, which may be derived from readings of the gyroscope 154.

At block 720, the unit 162 may determine an absolute acceleration signal based on the raw acceleration reading, and the detected orientation of the mobile device 110. At block 730, the step frequency determination unit 164 may determine a user's step frequency based on the absolute acceleration signal. At block 740, the moving direction estimation unit 166 may model the vibration motion of the mobile device 110, in particular, model the acceleration of the mobile device 110. Specifically, the unit 166 may fit observed empirical data to a theoretical model at the step frequency. The unit 166 may find the model parameters that maximize the fitness between the observed empirical data and the theoretical model. The unit 166 may estimate possible moving directions during this process. At block 750, the positive direction determination unit 168 may determine the user's moving direction. Details regarding each unit of the TFF are provided below.

5.1 Absolute Acceleration Determination

Figure 8:
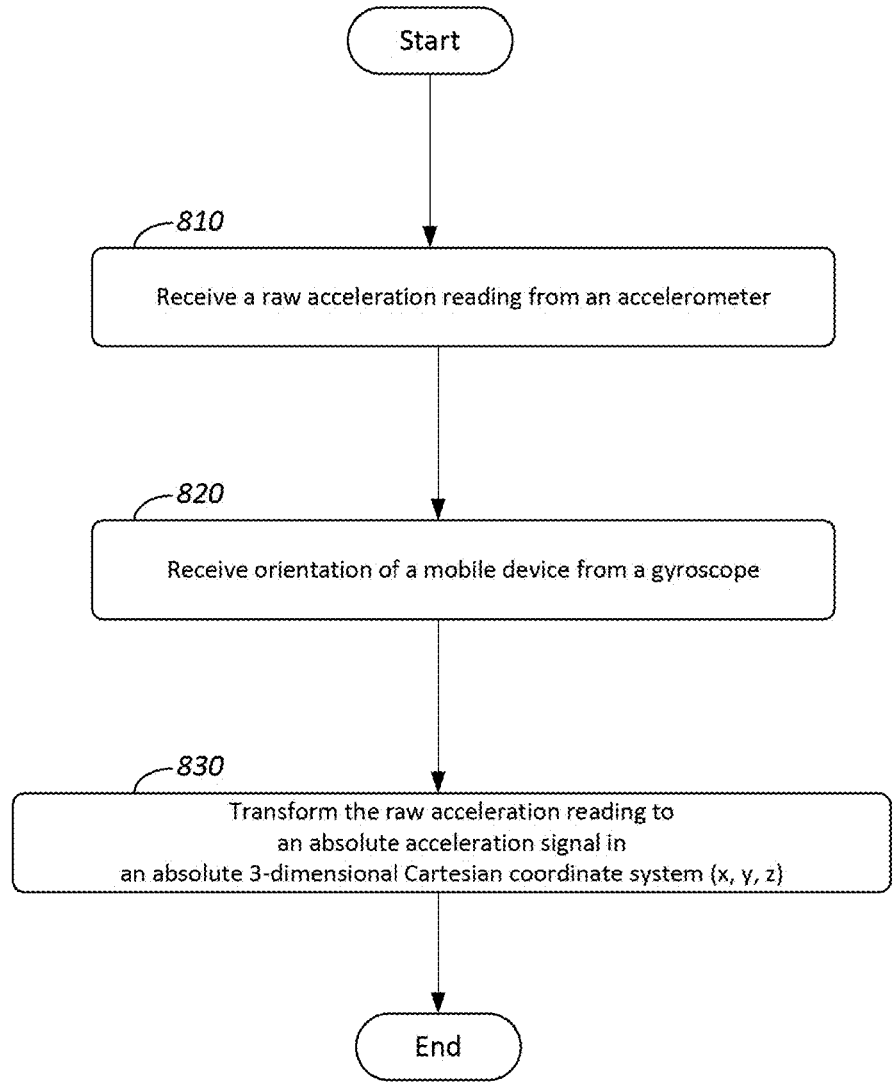
FIG. 8 is an example flow diagram of a process by an absolute acceleration determination unit.

FIG. 8 is a flow diagram illustrating a process by the absolute acceleration determination unit 162. At block 810, the unit 162 may receive a raw acceleration reading, e.g., ($R_a$, $R_b$, $R_c$), from the accelerometer 152. The raw acceleration reading may have three components each along one of the axes "a," "b," and "c" of the mobile device 110 as illustrated in FIG. 5A.

At block 820, the unit 162 may receive a detected orientation from the gyroscope 154. As illustrated in FIG. 5B, the detected orientation may be represented by an angle "β" relative to the direction of Earth's gravity.

Subsequently, at block 830, the unit 162 may use the detected orientation to determine an initial rotation matrix that converts the mobile device's reference system to an absolute reference system, or an absolute 3-dimensional Cartesian coordinate system.

As shown in FIG. 5C, the absolute 3-dimensional Cartesian coordinate system has three axes "x," "y," and "z," where the axis "x" extends along the North-South direction, the axis "y" extends along the East-West direction, and the axis "z" extends in parallel to the direction of Earth's gravity.

The unit 162 may transform the raw acceleration reading to an absolute acceleration signal in the absolute 3-dimensional Cartesian coordinate system. Similar to the raw acceleration reading, the absolute acceleration signal may have three components ($R_x$, $R_y$, $R_z$) each along one of the axes "x," "y," and "z." Thereafter, the unit 162 may output the absolute acceleration signal ($R_x$, $R_y$, $R_z$).

5.2 Step Frequency Determination

The step frequency determination unit 164 may be configured to determine a user's step frequency, namely, a rhythm or pace of a user's footsteps. An example of a user's step frequency is 1.54 steps/sec. A footstep may include a single complete movement of raising one foot from one spot on a ground and putting it down in another spot. The unit 164 may have a status identifier variable to record a foot movement. The status identifier may be set to "UP" once the unit 164 detects that the user 130 is raising one foot from the ground. The status identifier may be set to "DOWN" once the unit 164 detects that the user 130 is landing one foot on the ground. The status identifier may have a default value of "DOWN."

Figure 9:
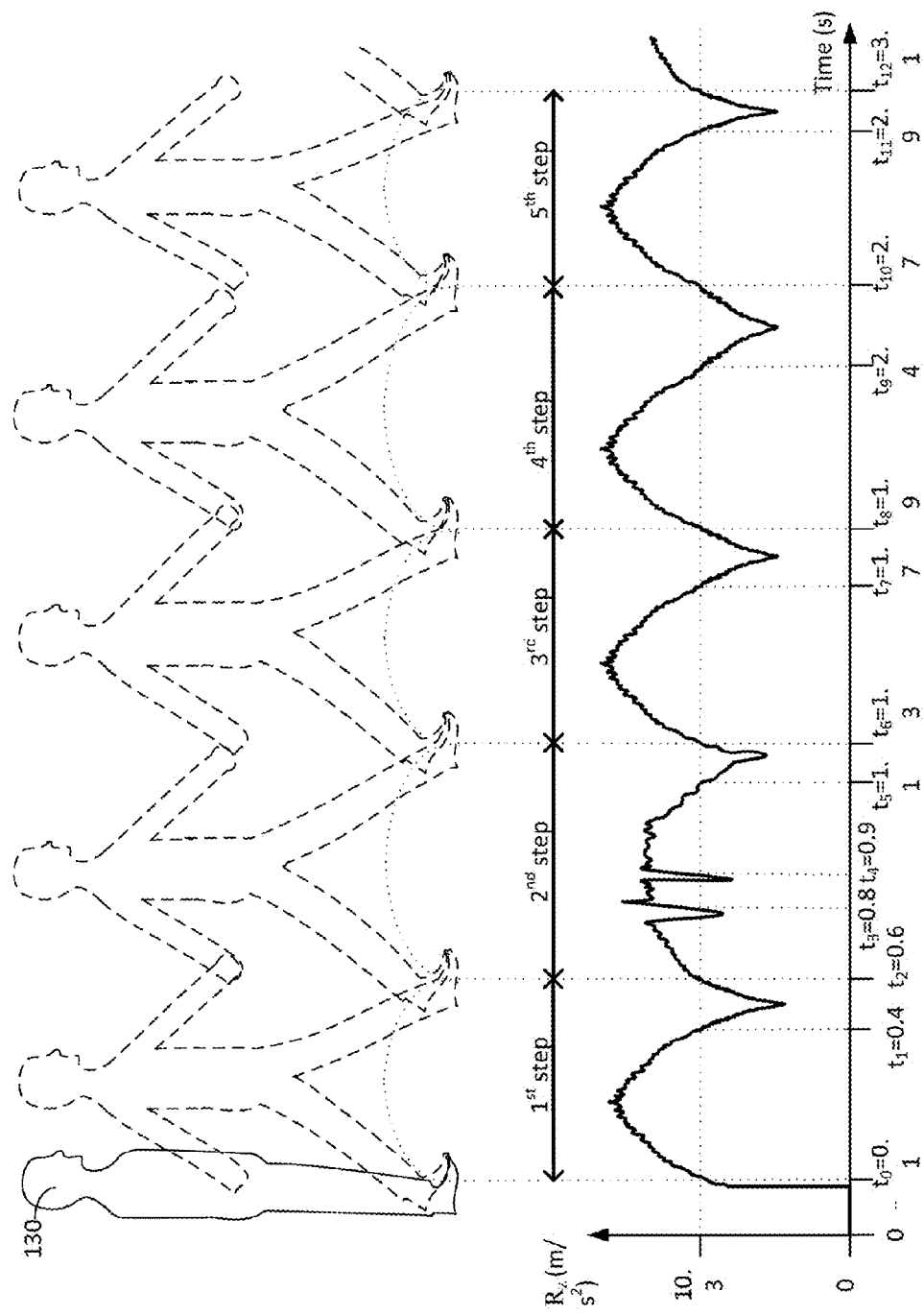
FIG. 9 is an example diagram illustrating variation in an acceleration signal relative to a user's footsteps.

In one embodiment, the unit 164 may determine whether the user is raising or lowering a foot based on a vertical absolute acceleration value, i.e., the absolute acceleration $R_z$ along the "z" axis. For instance, FIG. 9 illustrates rhythms of a user's footsteps during walking, particularly, illustrating an exemplary variation of $R_z$ during each footstep. As illustrated in FIG. 9, $R_z$ remains zero when the user 130 is in a standstill position, rapidly increases when a user 130 raises a foot, and rapidly decreases when the user 130 lands a foot. The status identifier may be set to "DOWN" by default, such that the status identifier is set to "DOWN" when the user 130 is in the standstill position. The unit 164 may set the status identifier to "UP" when $R_z$ exceeds an acceleration threshold, e.g., 10.3 m/s$^2$, and may set the status identifier to "DOWN" when $R_z$ falls below the acceleration threshold.

In one embodiment, the unit 164 may determine the start of a footstep when the status identifier changes from "DOWN" to "UP," and may determine the end of a footstep and the start of a next footstep when the status identifier changes from "DOWN" to "UP" for a second time.

FIG. 10 illustrates a table 1000 that identifies changes in the status identifier based on the example illustrated in FIG. 10. Column 1010 is a list of time instants of FIG. 10. Columns 1020 and 1030 each relate to the change in the status identifier from "DOWN" to "UP" and from "UP" to "DOWN." Column 1040 identifies the start and end of each footstep.

In one example as shown in FIG. 10, the status identifier changes from "DOWN" to "UP" at $t_0$ when $R_z$ exceeds the threshold value. The unit 164 records the time $t_0$ as the starting time associated with a first footstep. The status identifier later changes from "UP" to "DOWN" at $t_1$ when $R_z$ falls below the threshold. Subsequently, when the status identifier changes from "DOWN" to "UP" for a second time at $t_2$, the unit 164 records the time $t_2$ as the ending time of the first footstep as well as the starting time of the next footstep. The time cost associated with the completion of the first footstep may be calculated by subtracting $t_2$ by $t_0$. The unit 164 may repeat the above process to identify subsequent footsteps and determine the time cost associated with each footstep.

Sometimes abrupt changes in $R_z$ may occur due to signal fluctuations or inaccuracy of the INS 151, which may prevent an accurate determination of a footstep. For that reason, a footstep threshold may be used to exclude a footstep that is below a predetermined time period. For instance, the footstep threshold may be 0.4 seconds. In practice, when the determined time cost for a footstep is below the footstep threshold, the unit 164 may regard the footstep as incomplete, thereby discarding the ending time and waiting for the next change of the status identifier from "DOWN" to "UP." For instance, with reference to FIGS. 9-10, after detecting the start of the $2^{nd}$ footstep at $t_2$, the unit 164 detects a subsequent change of the status identifier from "DOWN" to "UP" at time $t_3$. However, the time lapse between $t_2$ and $t_3$ is 0.2 seconds, which is below the footstep threshold. Accordingly, time $t_3$ is not considered as the ending time for the second step. The unit 164 then proceeds to wait for the next change of the status identifier from "DOWN" to "UP," which occurs at time t4. However, time t4 is also not considered as the ending time for the second step due to the fact that the time lapse between t2 and t4 is also below the footstep threshold. Following the above rationale, the unit 164 detects that the ending time for the second step is at time $t_6$. FIGS. 9-10 illustrate identification of five steps according to the above methodology.

Figure 11:
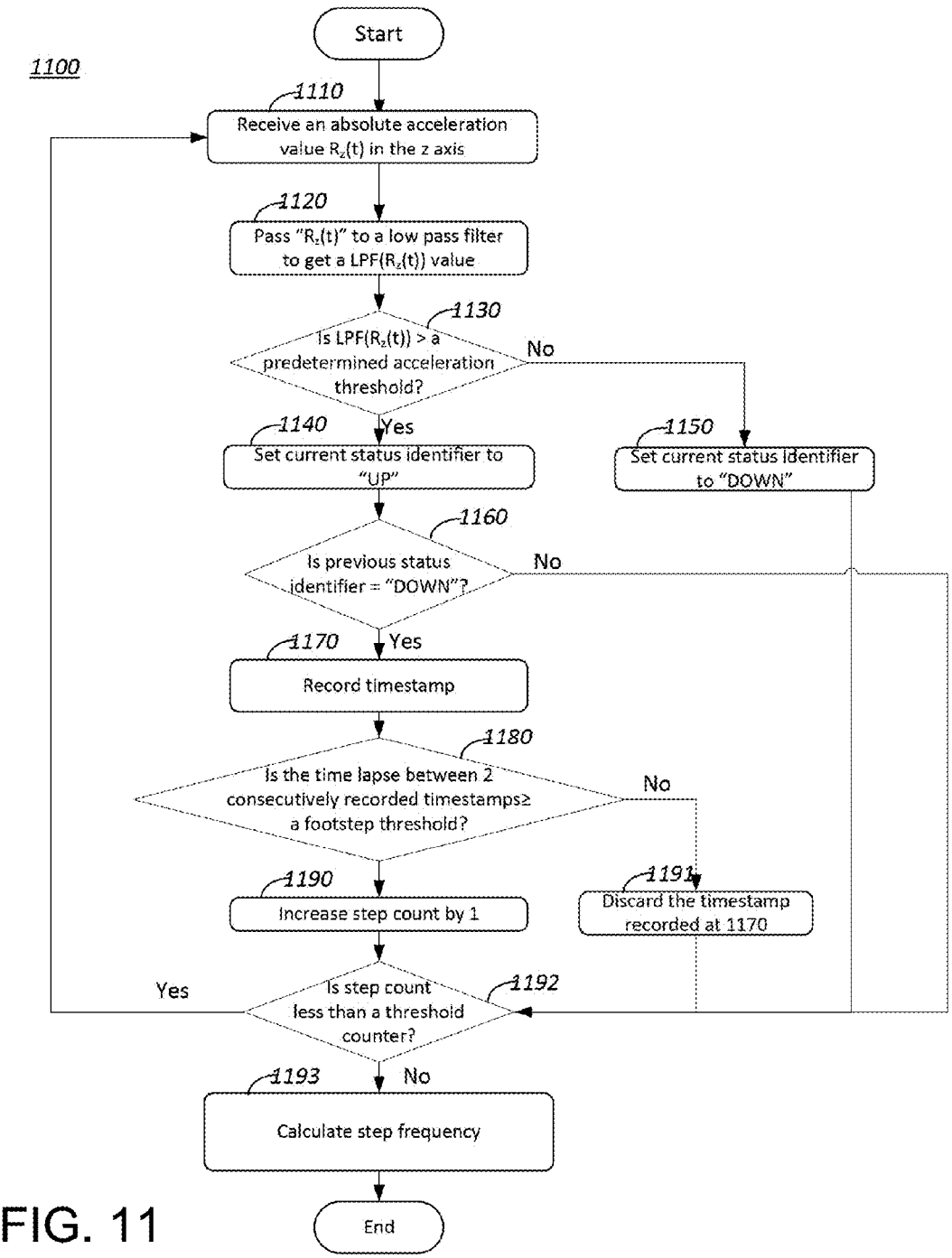
FIG. 11 is an example flow diagram of a process by a step frequency determination unit.

FIG. 11 is a flow chart that illustrates an example detailed process performed by the unit 164. At block 1110, the unit 164 may receive a vertical component of the absolute acceleration signal along the z axis, namely, $R_z$, from the absolute acceleration determination unit 162. The absolute acceleration signal may be a continuous-time signal or a discrete-time signal. For that reason, $R_z$ may also be represented as $R_z(t)$.

At block 1120, the unit 164 may pass the signal $R_z(t)$ to a low pass filter to obtain a low passed signal, $LPF(R_z(t))$. In one example, the low pass filter may have a 0.2 ratio.

At block 1130, the unit 164 may compare the low passed signal $LPF(R_z(t))$ to an acceleration threshold, e.g., 10.3 m/s². If $LPF(R_z(t))$ is above the acceleration threshold, the unit 164 may set the status identifier to "UP" at block 1140, and then proceed to block 1160. If the $LPF(R_z)$ signal is not above the acceleration threshold, the unit 164 may set the status identifier to "DOWN" at block 1150, and then proceed to block 1192 which will be described later.

At block 1160, the unit 164 may detect if the status identifier has been changed from "DOWN" to "UP," i.e., if the status identifier was previously set to "DOWN." If the status identifier has been changed from "DOWN" to "UP," the unit 164 may proceed to record the timestamp at block 1170, and presume this timestamp to be the ending time of a completed footstep as well as the starting time of a new footstep. If the status identifier has not been changed from "DOWN" to "UP," the unit 164 may proceed to block 1192.

At block 1180, the unit 164 may determine the time lapse between the newly recorded timestamp and the previously recorded timestamp. If the time lapse is equal to or greater than the footstep threshold, e.g., 0.4 seconds, then the unit 164 may increase a footstep count by 1 at block 1190. The footstep count may be a parameter to keep track of the number of footsteps. If the time lapse is below the footstep threshold, the unit 164 may discard the newly recorded timestamp at block 1191 and proceed to block 1192.

At block 1192, the unit 164 may determine if the footstep count has reached a count threshold, e.g., 5 footsteps. If false, the unit 164 may return to block 1110 to determine the next footstep. Once the footstep count has reached the count threshold, the unit 164 may proceed to calculate the step frequency (f) at block 1193.

At block 1193, the unit 164 may calculate the step frequency by dividing the number of steps over the total time cost associated therewith, according to the formula shown below.

$$\text{Step frequency}(f) = \frac{\text{Step Count}}{\text{Time cost for those steps}}$$

To calculate the total time cost associated with all the footsteps, the unit 164 may subtract the ending time associated with the last footstep by the starting time associated with the first footstep. For instance, with regard to the example illustrated in FIGS. 9-10, the total time cost is the difference between time $t_{12}$ and time $t_0$, which is 3 seconds. The unit 164 may then divide the step count by the total time cost to derive the step frequency. In the example illustrated in FIGS. 9-10, the step frequency (f) is approximately 1.67 footstep/second (Hz). Thereafter, the unit 164 may output the step frequency to the moving direction estimation unit 166.

5.3 Possible Moving directions Estimation

The moving direction estimation unit 166 may determine possible moving directions of a user by modeling the vibration motion of the mobile device 110. In particular, the unit 166 may use a theoretical model to represent one aspect of the vibration motion, e.g., acceleration, of the mobile device 110.

The unit 166 may fit observed empirical data to the theoretical model at the step frequency determined by the unit 164. Any vibration motion, more particularly, any acceleration, outside of the step frequency is regarded as noises. By fitting the observed empirical data to the theoretical model at the step frequency, noises are thereby eliminated from the modeling process. As such, the theoretical model may be regarded as a close approximation to the user's acceleration.

The parameters of the theoretical model may not be fixed but, instead, they may be estimated from the observed empirical data. In particular, the unit 166 may find parameters associated with the theoretical model by maximizing the fitness between the observed empirical data and the theoretical model. Possible directions of the user's movement may be determined during this process.

The observed empirical data may include the absolute acceleration output by the absolute acceleration determination unit 162. The step frequency may be the signal output by the step frequency determination unit 164. The theoretical model may be a sinusoidal function of time (t). The sinusoidal function may generally have the following form:

$$M(t) = A \times \sin(\omega t + \theta) + A_1 \quad (1)$$

where:
- A, the amplitude, is the peak deviation of the function from zero, where zero represents the ground level;
- ω, the angular frequency, is the rate of change of the function argument in units of radians per second, and ω may be computed by multiplying the step frequency (e.g., 1.67 Hz) by n/180°;
- θ, the phase, specifies (in radians) where in the cycle at time t=0; and
- $A_1$, the shift of the function above zero or the ground level.

Figure 12:
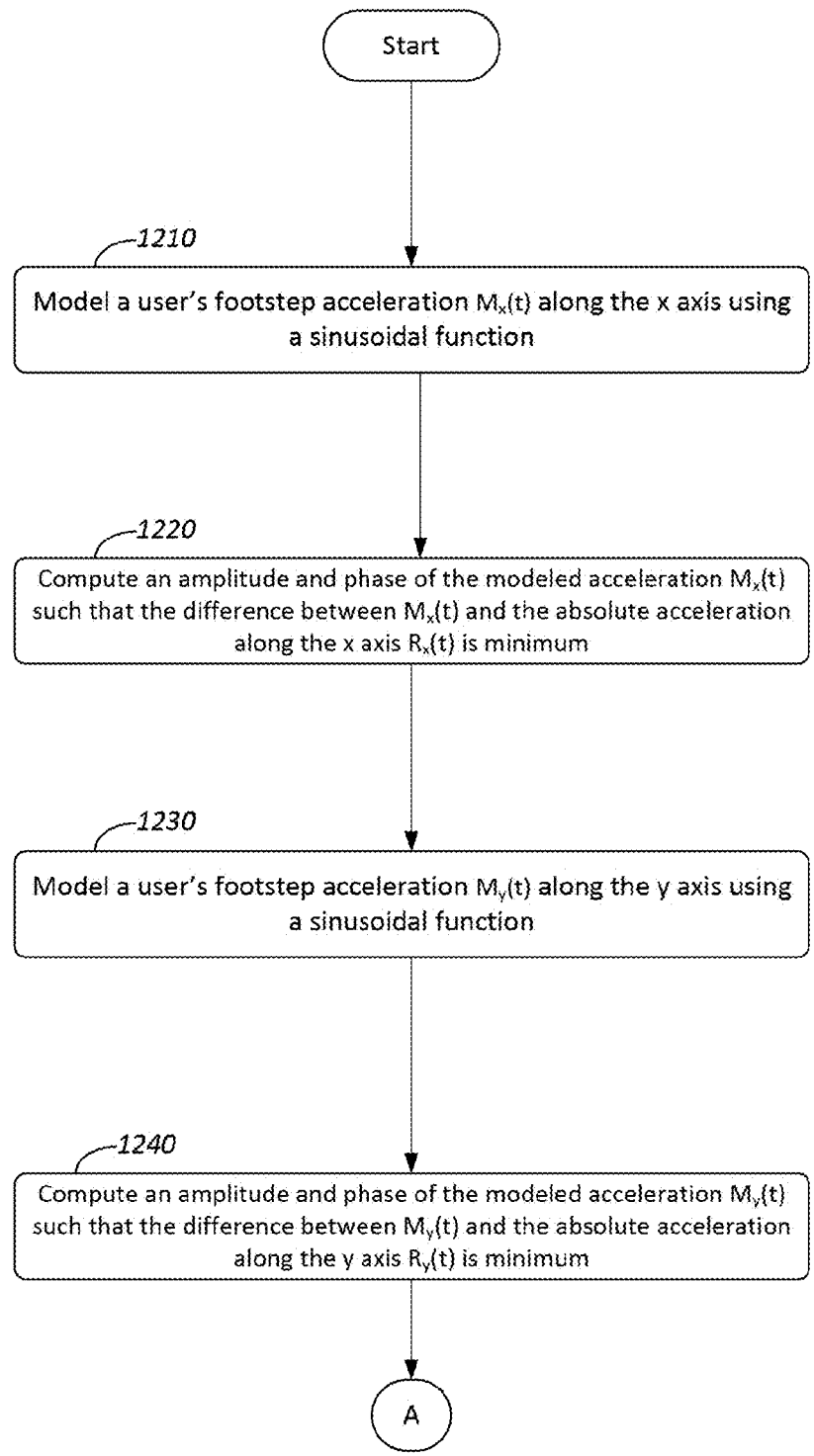
FIGS. 12-13 are example flow diagrams of a process by a moving direction estimation unit.
Figure 13:
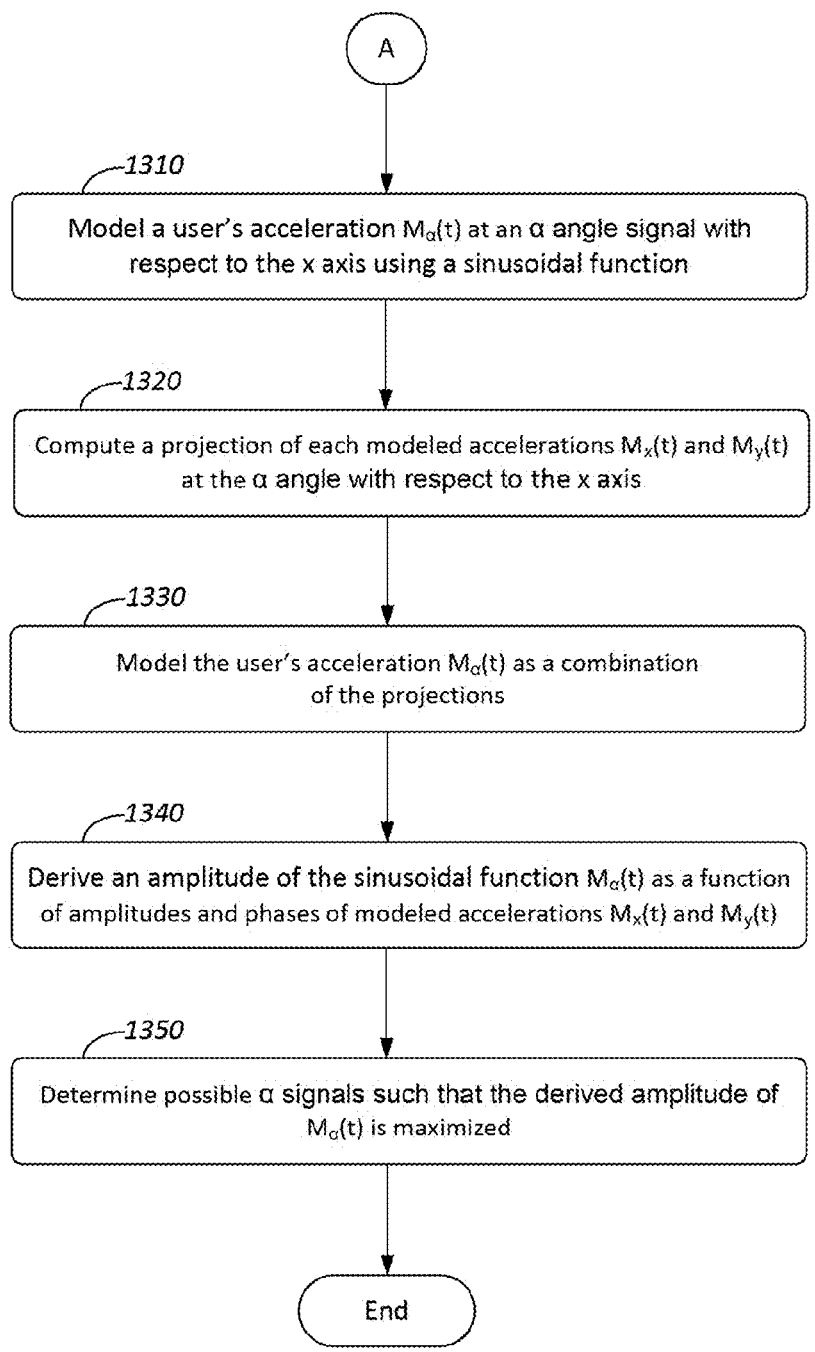

FIGS. 12-13 are flowcharts illustrating an example process performed by the unit 166. The unit 166 may model the user's acceleration using the absolute 3-dimensional Cartesian coordinate system. As such, the unit 166 may model the user's acceleration along each of the axes "x," "y" and "z" using sinusoidal functions $M_x(t)$, $M_y(t)$, and $M_z(t)$, respectively, all following the general form M(t) discussed above.

For example, at block 1210, the unit 166 may model a user's acceleration along the x axis as follows:

$$M_x(t) = A_x * \sin(\omega t + \theta_x) + A_{1x} \quad (2)$$

At block 1210, the unit 166 may determine the amplitude $A_x$ and the phase $\theta_x$ of the modeled acceleration $M_x(t)$ based on the absolute accelerations $R_x(t)$ provided by the absolute acceleration determination unit 162, according to the following steps.

At step 1, the unit 166 may transform $M_x(t)$ as follows:

$$M_x(t) = A_x * \sin(\omega t + \theta_x) + A_{1x} = A_x * \sin(\omega t)\cos\theta_x + A_x * \cos(\omega t)\sin\theta_x + A_{1x} \quad (4)$$

At step 2, the unit 166 may simply the formula (4) by letting:

$$A_{2x}=A_x*\cos\theta_x \qquad (5)$$

$$A_{3x}=A_x*\sin\theta_x \qquad (6)$$

$$P = \begin{pmatrix} 1 \\ \sin(\omega t) \\ \cos(\omega t) \end{pmatrix} \qquad (7)$$

and substituting the formulas (5), (6), and (7) into (4). As a result, the formula (4) is transformed into a new formula shown below.

$$M_x(t)=(A_{1x}A_{2x}A_{3x})\times P \qquad (8)$$

At step 3, to best fit the actual acceleration along the x axis, namely, $R_x$, to the modeled acceleration $M_x(t)$, parameters of the modeled acceleration $M_x(t)$, e.g., $A_{1x}$, $A_{2x}$, and $A_{3x}$, may be selected such that the difference between $M_x(t)$ and $R_x(t)$ is minimum, or the following signal as fed to a low pass filter is minimized.

$$LPF(M_x(t)-R_x(t))^2=LPF((A_{1x}A_{2x}A_{3x})\times P-R_x(t))^2 \qquad (9)$$

When the signal represented by the formula (9) has a minimum value, its derivative as shown below is 0.

$$\frac{d(LPF(A_{1x}\ A_{2x}\ A_{3x})\times P - R_x(t))^2}{d(A_{1x}\ A_{2x}\ A_{3x})} = 0 \qquad (10)$$

Based on the formula (10), the unit 166 may determine the parameters $A_{1x}$, $A_{2x}$, and $A_{3x}$ as follows.

$$(A_{1x}\ A_{2x}\ A_{3x}) = \frac{LPF(Rx(t)\times P)}{LPF(P^T\times P)} \qquad (11)$$

At step 4, once the parameters $A_{1x}$, $A_{2x}$, and $A_{3x}$ have been determined, the unit 166 may determine the amplitude $A_x$ according to the following formula derived from formulas (5) and (6).

$$A_x = \sqrt{A_{2x}^2 + A_{3x}^2} \qquad (12)$$

Similarly, at step 5, the unit 166 may determine the phase $\theta_x$ according to the following formula derived from formulas (5) and (6).

$$\theta_x = \tan^{-1}\left(\frac{A_{3x}}{A_{2x}}\right) + k\pi, \text{ where } (k=0, 1) \qquad (13)$$

At block 1230, similar to block 1210, the unit 166 may model a user's acceleration along the y axis as follows:

$$M_y(t)=A_y*\sin(\omega t+\theta_y)\pm A_{1y}$$

At block 1240, the unit 166 may determine parameters of the modeled accelerations $M_y(t)$ including the amplitude $A_y$ and the phase $\theta_y$, based on the absolute accelerations $R_y(t)$ provided by the absolute acceleration determination unit 162. The unit 166 may compute the amplitude $A_y$ and the phase $\theta_y$ based on similar steps described with regard to block 1220.

Once parameters of the modeled accelerations $M_x(t)$ and $M_y(t)$ such as the amplitudes and phases have been determined, the unit 166 may estimate the user's possible moving direction as follows.

At block 1310, the unit 166 may assume that the user is moving in a direction that forms an angle α with respect to the East direction. The unit 166 may model the user's acceleration in the user's direction of movement $M_\alpha(t)$ based on the general formula (1) discussed earlier.

$$M_\alpha(t)=A_\alpha*\sin(\omega t+\theta_\alpha)+A_{1\alpha} \qquad (14)$$

When $A_{1\alpha}$ is assumed to be zero, the formula (14) may be transformed as follows.

$$M_\alpha(t)=(A_\alpha\sin\theta_\alpha)\times\cos(\omega t)+(A_\alpha\cos\theta_\alpha)\times\sin(\omega) \qquad (15)$$

Then, the unit 166 may estimate possible α values as follows. At block 1320, the unit 166 may project or cast the modeled acceleration along the x axis, namely, $M_x(t)$, in the α direction, as $M_x(t)\times\cos\alpha$. The unit 166 may also project or cast the modeled acceleration along the y axis, namely, $M_y(t)$, in the α direction, as $M_y(t)\times\sin\alpha$.

At block 1330, the unit 166 may compute the modeled acceleration in the α direction $M_\alpha(t)$ as a combination of the projections. For instance, the modeled acceleration may be expressed as follows.

$$M_\alpha(t)=M_x(t)\times\cos\alpha+M_y(t)\times\sin\alpha=(A_x*\sin(\omega t+\theta_x)+A_{1x})\times\cos\alpha+(A_y*\sin(\omega t+\theta_y)+A_{1y})\times\sin\alpha \qquad (16)$$

Next, assume $A_{1x}$ and $A_{1y}$ are zero, the formula (16) may be transformed as follows.

$$M_\alpha(t)=(A_x*\sin(\omega t+\theta_x))\times\cos\alpha+(A_y*\sin(\omega t+\theta_y))\times\sin\alpha=[A_x\sin(\theta_x)\cos(\alpha)+A_y\sin(\theta_y)\sin(\alpha)]\times\cos(\omega t)+[A_x\cos(\theta_x)\cos(\alpha)+A_y\cos(\theta_y)\sin(\alpha)]\times\sin(\omega t) \qquad (17)$$

At block 1340, the unit 166 may derive the amplitude $A_\alpha$ based on the formulas (16) and (17) as follows.

$$A_\alpha^2=[A_x\sin(\theta_x)\cos(\alpha)+A_y\sin(\theta_y)\sin(\alpha)]^2+[A_x\cos(\theta_x)\cos(\alpha)+A_y\cos(\theta_y)\sin(\alpha)]^2=A_x^2\cos^2(\alpha)+A_y^2\sin^2(\alpha)+2A_xA_y\cos(\theta_x-\theta_y)\sin(\alpha)\cos(\alpha) \qquad (18)$$

At block 1350, the unit 166 may determine the user's possible directions of movement, e.g., possible α values, by maximizing the user's acceleration in the α direction. In one example, when $A_\alpha^2$ is maximized or its derivative is zero as shown below, corresponding α may be regarded as possible user's direction of movement.

$$\frac{d(A_\alpha^2)}{d(\alpha)} = 0 \qquad (19)$$

$$\Rightarrow \frac{d(A_x^2\cos2(\alpha)+A_y^2\sin2(\alpha)+2A_xA_y\cos(\theta_x-\theta_y)\sin(\alpha)\cos(\alpha))}{d(\alpha)} = 0$$

Based on the formula (19), α may be calculated as follows.

$$\alpha = \frac{1}{2}\tan^{-1}\left(\frac{2A_xA_y\cos(\theta_x-\theta_y)}{A_y^2-A_x^2}\right) + k\times\frac{\pi}{2}, (k=0, 1, 2, 3) \qquad (20)$$

Formula (20) results in four different values for a, two of which minimize the amplitude $A_\alpha$, while the remaining two maximize the amplitude $A_\alpha$. The unit 166 may substitute each value of α back into the formula for $A_\alpha$, discard the two α values that minimize $A_\alpha$, and regard the two α values that maximize $A_\alpha$ as the possible user's directions of movement.

The two α values that maximize $A_α$ differ from each other by π, or 180°. Each of them represents a possible user's direction of movement. Since the two directions are on the same axis, the axis along which the user moves along may thus be determined.

Figure 2B:
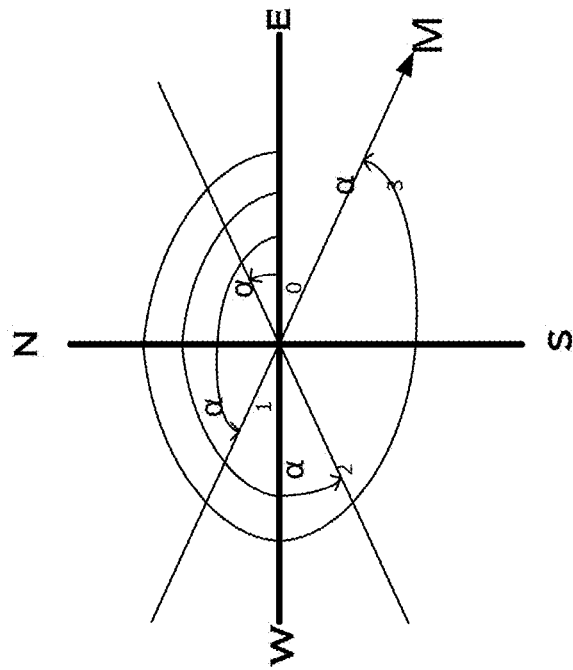
FIG. 2B illustrates example possible moving directions based on the user moving scenario of FIG. 2A.
Figure 2A:
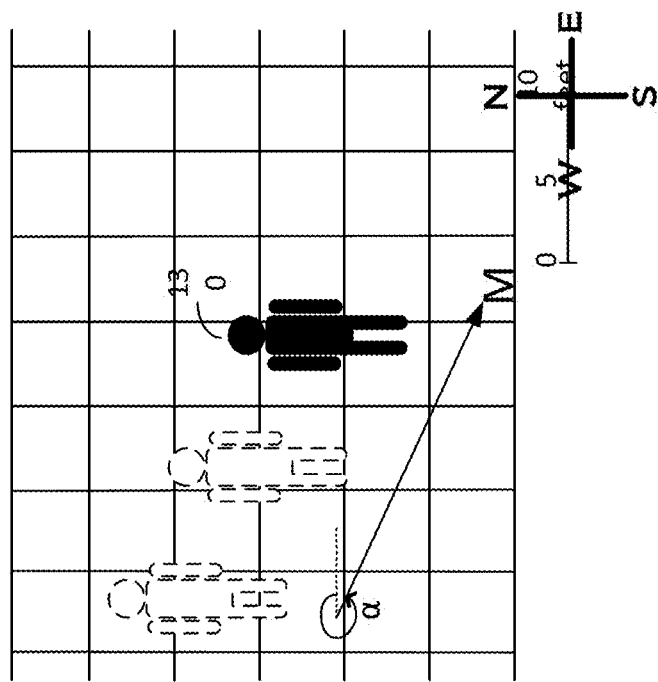
FIG. 2A is a planar view of the user moving in the example direction of FIG. 1.

In the example illustrated in FIGS. 2A-2B, the user 130 is moving in the "M" direction, which forms an angle "α" with respect to the East direction. The unit 166 may determine four values for α according to the formula (20), including $α_0$, $α_1$, $α_2$ and $α_3$. Among the four values, only $α_1$ and $α_3$ may maximize the amplitude $A_α$. As shown in FIG. 2B, $α_1$ and $α_3$ are completely opposite from each other. Based on $α_1$ and $α_3$, the unit 166 may determine the axis along which the user moves along.

The unit 166 may pass possible determination of α through a low pass filter to get a smooth result. The low pass filter may have a ratio of 0.05.

Thereafter, the unit 166 may output α values as possible moving directions. In one embodiment, the unit 166 may output the possible moving directions to the Input/Output device 144 for display or other purposes. In another embodiment, the unit 166 may output the possible moving directions to the positive direction determination unit 168 for a further determination of which of the two possible directions represent the positive moving direction, namely, the actual moving direction.

5.4 Positive Moving Direction Determination

Figure 14:
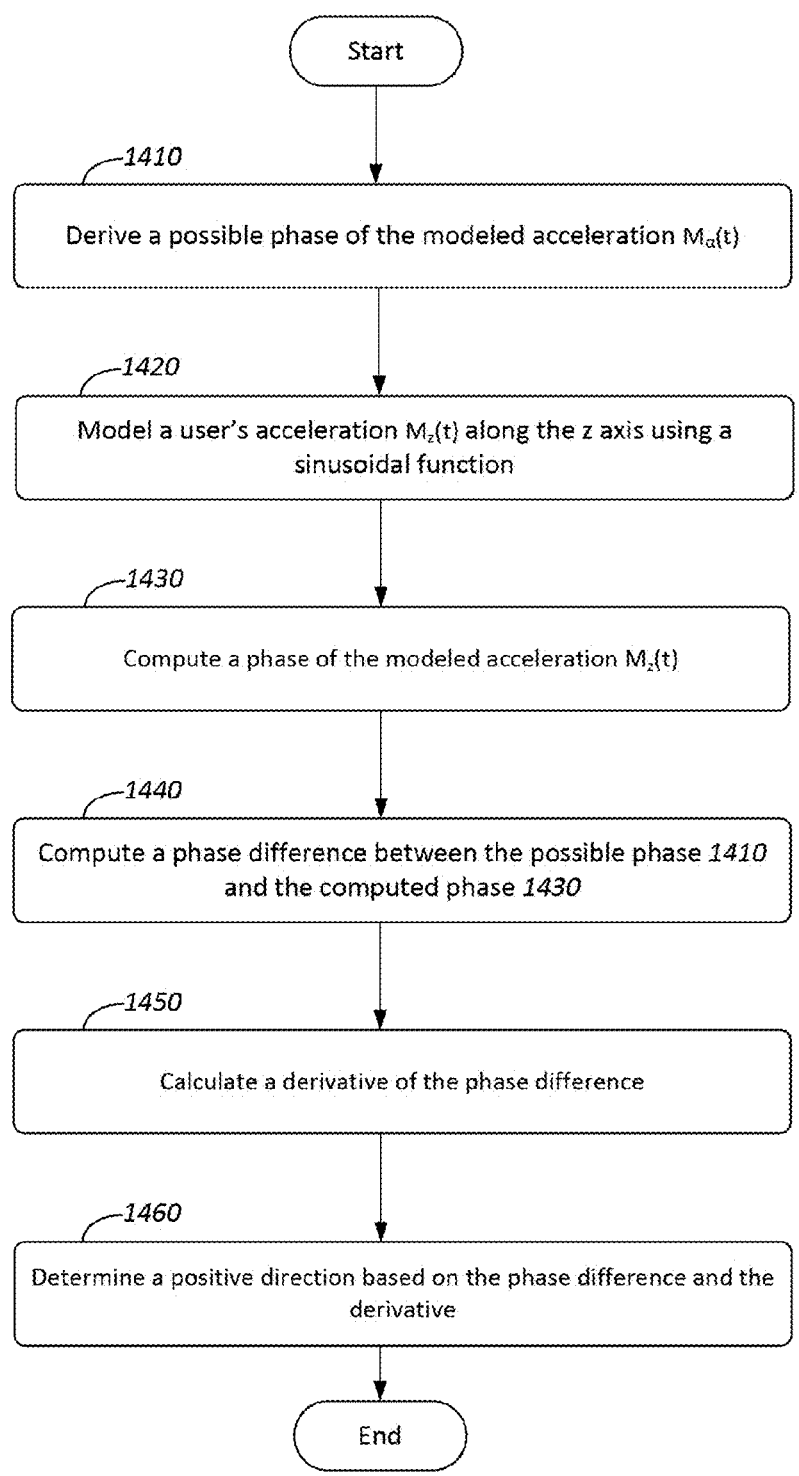
FIG. 14 is a flow diagram of a process by a positive direction determination unit.

FIG. 14 is a flowchart that illustrates an example process performed by the positive direction determination unit 168. The unit 168 may process each α value provided by the movement direction estimation unit 166 separately. The unit 168 may determine whether each α value represents the positive or actual moving direction according to the process described below.

At block 1410, the unit 168 may determine the phase $θ_α$ of the modeled acceleration $M_α(t)$ according to the following formulas (21) and (22), which are derived from formulas (16) and (17).

$$\sin θ_α = \frac{A_x \sin(θ_x) \cos α + A_y \sin(θ_y) \sin α}{A_α} \quad (21)$$

$$\cos θ_α = \frac{A_x \cos(θ_x) \cos α + A_y \cos(θ_y) \sin α}{A_α} \quad (22)$$

For each α value output by the moving direction estimation unit 166, the unit 168 may substitute the α value into formulas (21) and (22), and to compute the phase $θ_α$.

At block 1420, the unit 168 may model a user's acceleration along the z axis according to the general formula (1) as follows.

$$M_z(t) = A_z * \sin(ωt + θ_z) + A_{1z} \quad (23)$$

At block 1430, the unit 168 may compute the phase $θ_z$ using algorithms similar to that used for $θ_x$ discussed in connection with block 1220 of FIG. 12.

At block 1440, the unit 168 may determine a phase difference $θ_{diff}(t)$ between a possible phase $θ_α$ determined at block 1410 and the phase $θ_z$ determined at block 1430.

$$θ_{diff}(t) = θ_y(t) - θ_z(t) ± 2π, θ_{diff}(t) ∈ [-π, π) \quad (24)$$

The unit 168 may pass the phase difference $θ_{diff}(t)$ to a low pass filter to get a smooth phase difference signal $LPF(θ_{diff}(t))$.

At block 1450, the unit 168 may calculate a derivative of the phase difference as follows.

$$Δ(LPF(θ_{diff}(t))) = LPF(θ_{diff}(t)) - LPF(θ_{diff}(t-1)) \quad (25)$$

Here, the unit 168 may use two low pass filters and a delay circuit to compute the derivative.

The derivative of the phase difference may represent the stableness of the phase difference. A small derivative may suggest that the phase difference is relatively stable.

At block 1460, based on the values of the phase difference $LPF(θ_{diff}(t))$ and the derivative of the phase difference $Δ(LPF(θ_{diff}(t)))$, the unit 168 may verify whether the α value provided by the moving direction estimation unit 166 in fact represents the user's positive or actual direction of movement.

In one embodiment, the unit 168 may make the determination by following the rules illustrated in Table 1 below.

TABLE 1

| $Δ(LPF(θ_{diff}(t)))$ | $LPF(θ_{diff}(t))$ | Direction Determination |
|---|---|---|
| >0.5 | Any | Unknown |
| <0.5 | (−∞, −0.75π) U (0.75π, ∞) | Negative |
|  | (−0.25π, 0.25π) | Positive |
|  | [−0.75π, −0.25π] U [0.25π, 0.75π] | Unknown |

As shown in Table 1, a small phase difference $LPF(θ_{diff}(t))$, e.g., within the range of (−0.25π, 0.25π), and a small derivative $Δ(LPF(θ_{diff}(t)))$, e.g., less than 0.5, may together indicate that the corresponding α value represents the actual or positive moving direction of the user. By contrast, a large phase difference $LPF(θ_{diff}(t))$, e.g., within the range of (−∞,−0.75π) or (0.75π, ∞), and a small derivative $Δ(LPF(θ_{diff}(t)))$, e.g., less than 0.5, may together indicate that the corresponding α value represents the negative moving direction of the user, which is opposite to the user's actual moving direction. For phase differences and derivatives fall within other ranges, the corresponding α values do not correspond to either the positive moving direction or the negative moving direction.

In the example discussed earlier with regard to FIGS. 2A-B, the moving direction estimation unit 166 outputs two α values: α1 and α3. The unit 168 may apply each α value to the process described above including blocks 1410-1460. In this example, α1 may result in a derivative $Δ(LPF(θ_{diff}(t)))$ that falls below 0.5, and may result in a phase difference $LPF(θ_{diff}(t))$ that falls within the range of (−∞, −0.75π) U (0.75π, ∞). As such, α1 may be regarded as corresponding to the negative moving direction of the user. By contrast, α3 may result in a derivative $Δ(LPF(θ_{diff}(t)))$ that falls below 0.5, and a phase difference $LPF(θ_{diff}(t))$ that falls within the range of (−0.25π, 0.25π). As such, α3 may be regarded as the positive moving direction of the user.

The unit 168 may use a trigger filter to eliminate unstable signals, signal fluctuations, or noise that adversely affects the determination of the user's direction of movement. As such, the unit 168 may ensure that any determination of the moving direction is based on a stable signal. In one example, the trigger filter may filter out any signal that does not remain relatively stable over a time threshold, e.g., 0.5 seconds.

Figure 15:
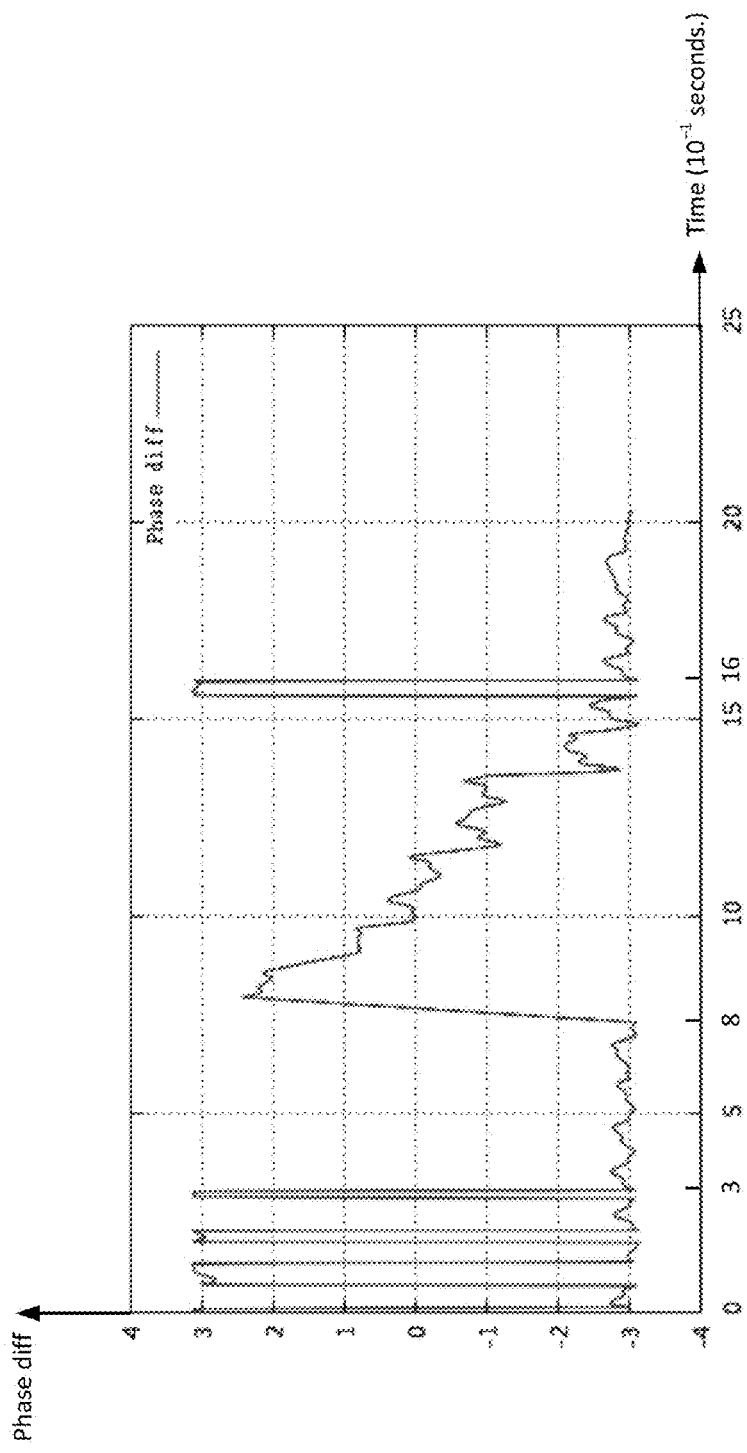
FIG. 15 is an example chart illustrating experimental results about a phase difference over time.
Figure 16:
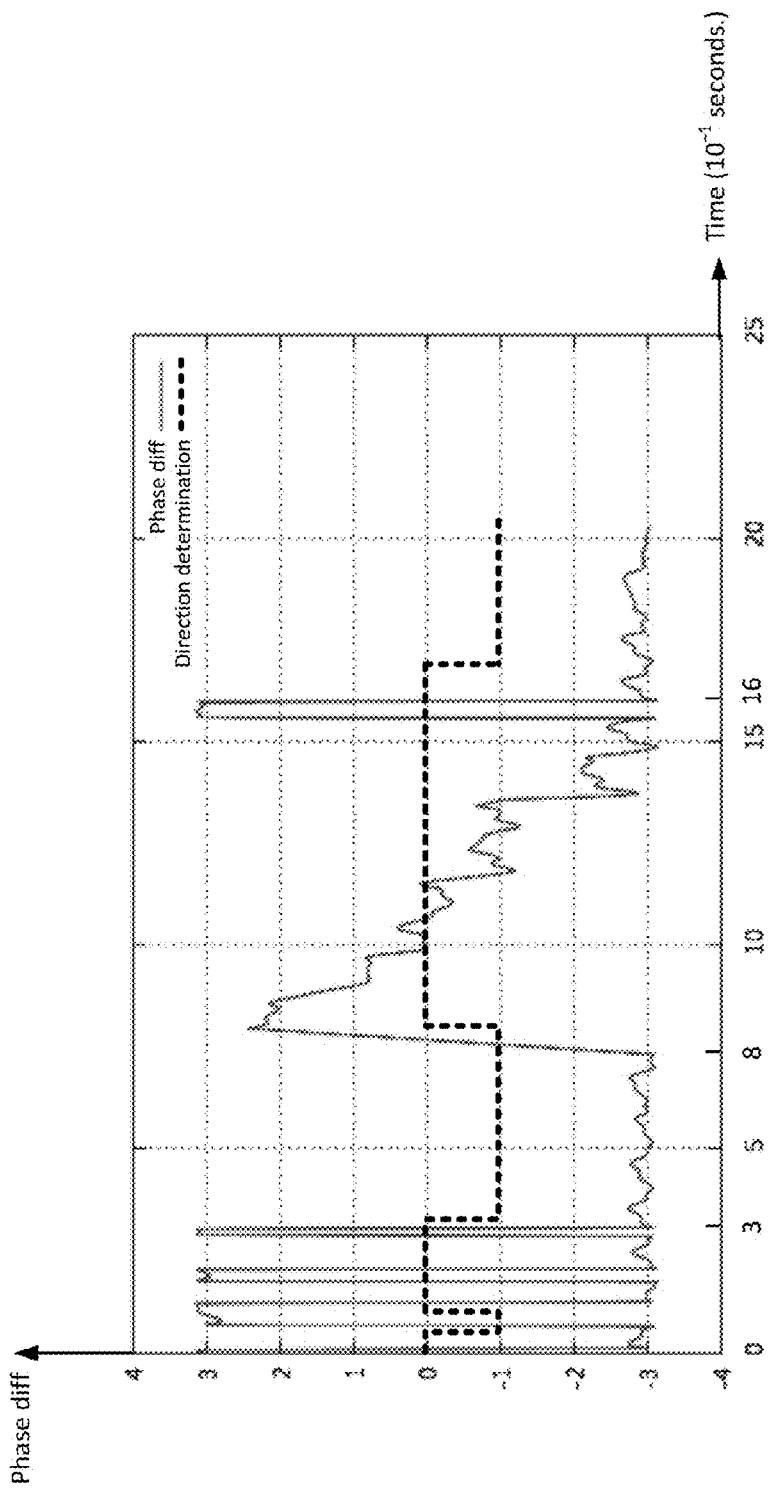
FIG. 16 is an example chart illustrating determination of a positive direction based on the experimental results of FIG. 15.

FIGS. 15-16 illustrate experimental results using the trigger filter. For instance, FIG. 15 illustrates a variation of the phase difference $LPF(θ_{diff}(t))$ over time, and FIG. 16 illustrates the corresponding direction determined based on the phase difference. As illustrated in FIG. 15, the phase difference LPF($\theta_{diff}$(t)), as represented by the solid lines, remains unstable during the first 0.3 seconds, stays stable at about "−3" for about 0.5 seconds. Thereafter, the phase difference rapidly changes over a period of time between the time instant 0.8 second and the time instant 1.6 second. Afterwards, the phase difference remains relatively stable at about "−3." FIG. 16 illustrates the corresponding direction for the same period of FIG. 15 using the dashed lines. As shown in FIG. 16, when the phase difference remains stable for less than 0.5 seconds, e.g., between the time instant 0 and the time instant 0.3 second, the corresponding direction may not be determined, thus has a value of zero. Further, when the phase difference is unstable, e.g., between the time instant 0.8 second and the time instant 1.6 second, the corresponding direction may not be determined, thus also has a value of zero. By contrast, when the phase difference remains stable for at least 0.5 seconds, e.g., between the time instant 0.3 second and the time instant 0.8 second, the corresponding direction may be determined. In this case a negative direction, represented by the value "−1," is determined. Once the negative direction is known, the unit 168 may determine the positive direction, which may be directly opposite to the negative direction.

Once the unit 168 determines the positive direction, the unit 168 may output the result to the Input/Output device 146.

5.5 Other Implementations

The implementation of the TFF system 160 described above with respect to the units 162-168, and the processes described therein, are merely illustrative and are not meant to be limiting. The TFF system 160 may include other units or variations thereof. For instance, one or more of the described units 162-168 of the TFF system 160 may be divided into additional units, or may be combined.

In the examples described above, the TFF system 160 models the user's acceleration using a theoretical model. In addition to acceleration, the TFF system 160 may model other aspects of a vibration motion, including for example the user's energy or the user's moving speed, and the TFF system 160 may determine the user's moving direction during the modeling process.

Further, the TFF system 160 may be implemented using the centralized computing mechanism or the distributed computing mechanism. For instance, as illustrated in FIG. 6, the TFF system 160 may be implemented entirely in the mobile device 110, such that the mobile device 110 can independently determine the user's moving direction.

Alternatively, the TFF system 160 may be implemented entirely in a server 122. The mobile device 110 may provide readings obtained from the INS 151 of the mobile device 110, particularly, readings from the accelerometer 152 and the gyroscope 154, to the server 122. After determining the user's moving direction, the server 122 may transmit the result to the mobile device 110. Alternatively, the server 122 may take further actions, such as executing other related applications.

In some other examples, the TFF system 160 may be implemented in part on the mobile device 110 and implemented in part on the server 122, such that the mobile device 110 and the server 122 may jointly or collaboratively determine the moving direction of the user 130.

6. EXAMPLE USE SCENARIO

The TFF system and its process may provide an accurate determination of a user's direction of movement based on the vibration motion of the mobile device 110, even when the vibration motion attributed by noise is as strong as the vibration motion attributed by the user's physical movement.

The TFF system and its process may support or be used in conjunction with a wide range of mobile applications, including but not limited to, location positioning, location navigation, location-aware search, commerce, and advertisements applications, among other possibilities. For instance, once the TFF system outputs a user's direction of movement, such information may be used along with other information to determine a location of a mobile user. Advertisements may be provided to the user based on the location of the mobile user.

A specific use scenario of the TFF system is discussed next in conjunction with FIG. 17, which illustrates an exemplary display 1710 of the mobile device 110. In this scenario, the TFF system may be implemented as part of a virtual tour guide of the Museum of Modern Art (MoMA). First, the mobile device 110 may pinpoint the user's current position 1712 on an interior map of the MoMA on the display 1710. The user may select a point of interest, e.g., "Contemporary Gallery," in the search box, as the target position. Next, the mobile device 130 may display the position of the Contemporary Gallery 1714 on the display 1710. The mobile device 130 may use the TFF process described above to continuously determine the user's moving direction a. Thereafter, the mobile device 130 may display on the screen 1710 the user's moving direction a in real time, and may dynamically guide the user to the target position 1714 in real time. In addition to the visual display 1710, the mobile device 110 may have an audio instruction to direct the mobile user to the target position.

7. CONCLUSION

Although aspects of the disclosure herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method of determining a moving direction of a mobile device, the method comprising:
   determining, by a processor, an acceleration signal associated with the mobile device, the acceleration signal three dimensions including a first dimension extending generally along a North-South direction, a second dimension extending generally along an East-West direction; and a third dimension extending generally along a direction of Earth's gravity;
   fitting the acceleration signal in each of the first, second and third dimensions to first, second, and third sinusoidal functions, respectively;
   modeling, with the processor, acceleration in the moving direction using a fourth sinusoidal function based on the first and second sinusoidal functions; and
   determining the moving direction based on a phase of the third sinusoidal function and a phase of the fourth sinusoidal function.

2. The method of claim 1, wherein the first, second, third, and fourth sinusoidal functions are based on a sinusoidal function according to the following equation:

$$M(t)=A*\sin(\omega t+\theta)+A_1,$$

where A represents an amplitude, t represents time, ω represents an angular frequency computed based on a step frequency of the user, θ represents a phase, and $A_1$ represents a shift of the sinusoidal function above zero.

3. The method of claim 1, further comprising determining amplitudes and phases of the first and second sinusoidal functions.

4. The method of claim 3, further comprising determining an amplitude of the fourth sinusoidal function based on the determined amplitudes and phases of the first and second sinusoidal functions.

5. The method of claim 4, further comprising determining at least one possible moving direction based on the amplitude of the fourth sinusoidal function.

6. The method of claim 5, further comprising determining the phase of the fourth sinusoidal function based on the at least one possible moving direction.

7. The method of claim 5, wherein the processor determines the moving direction by:
    determining a phase difference between the phase of the third sinusoidal function and the phase of the fourth sinusoidal function;
    determining a derivative of the phase difference; and
    determining the moving direction based on the phase difference and the derivative.

8. The method of claim 7, wherein the processor determines the at least one possible moving direction as the moving direction when the phase difference is in a first range and the derivative is in a second range.

9. The method of claim 8, wherein the first range is greater than −0.25π but less than 0.25π.

10. The method of claim 8, wherein the second range is below 0.5.

11. An apparatus for determining a moving direction of a mobile device, the apparatus comprising:
    a memory; and
    a processor in communication with the memory, the processor configured to:
        determine an acceleration signal associated with the mobile device, the acceleration signal having three dimensions including a first dimension extending generally along a North-South direction, a second dimension extending generally along an East-West direction; and a third dimension extending generally along a direction of Earth's gravity;
        fit the acceleration signal in each of the first, second and third dimensions to first, second and third sinusoidal functions, respectively;
        model acceleration in the moving direction using a fourth sinusoidal function based on the first and second sinusoidal functions; and
        determine the moving direction based on a phase of the third sinusoidal function and a phase of the fourth sinusoidal function.

12. The apparatus of claim 11, wherein the first, second, third, and fourth sinusoidal functions are based on a sinusoidal function according to the following equation:

$$M(t)=A*\sin(\omega t+e)+A_1,$$

where A represents an amplitude, t represents time, ω represents an angular frequency computed based on a step frequency of the user, θ represents a phase, and $A_1$ represents a shift of the sinusoidal function above zero.

13. The apparatus of claim 11, wherein the processor determines amplitudes and phases of the first and second sinusoidal functions.

14. The apparatus of claim 13, wherein the processor determines an amplitude of the fourth sinusoidal function based on the determined amplitudes and phases of the first and second sinusoidal functions.

15. The apparatus of claim 14, wherein the processor determines at least one possible moving direction based on the amplitude of the fourth sinusoidal function.

16. The apparatus of claim 15, wherein the processor determines the phase of the fourth sinusoidal function based on the at least one possible moving direction.

17. A non-transitory computer-readable storage medium on which computer readable instructions of a program are stored, the instructions, when executed by one or more processors, cause the one or more processors to perform a method, the method comprising:
    determining an acceleration signal associated with the mobile device, the acceleration signal three dimensions including a first dimension extending generally along a North-South direction, a second dimension extending generally along an East-West direction; and a third dimension extending generally along a direction of Earth's gravity;
    fitting the acceleration signal in each of the first, second and third dimensions to first, second, and third sinusoidal functions, respectively;
    modeling, with the processor, acceleration in the moving direction using a fourth sinusoidal function based on the first and second sinusoidal functions; and
    determining the moving direction based on a phase of the third sinusoidal function and a phase of the fourth sinusoidal function.

18. The medium of claim 17, wherein the first, second, third, and fourth sinusoidal functions are based on a sinusoidal function according to the following equation:

$$M(t)=A*\sin(\omega t+\theta)+A_1,$$

where A represents an amplitude, t represents time, ω represents an angular frequency computed based on a step frequency of the user, θ represents a phase, and $A_1$ represents a shift of the sinusoidal function above zero.

19. The medium of claim 17, further comprising determining amplitudes and phases of the first and second sinusoidal functions.

20. The medium of claim 19, further comprising determining an amplitude of the fourth sinusoidal function based on the determined amplitudes and phases of the first and second sinusoidal functions.

* * * * *